United States Patent [19]

Hiles

[11] Patent Number: 5,768,543

[45] Date of Patent: Jun. 16, 1998

[54] SLOT-TOKEN PROTOCOL

[75] Inventor: Paul Edward Hiles, Houston, Tex.

[73] Assignee: Paradyne Corporation, Largo, Fla.

[21] Appl. No.: 608,378

[22] Filed: Feb. 28, 1996

[51] Int. Cl.[6] ............................ G06F 13/14; G06F 15/177
[52] U.S. Cl. .................... 395/287; 395/309; 395/200.38;
395/200.5
[58] Field of Search ..................................... 395/290, 293,
395/296, 298, 309, 306, 200.02, 200.05,
200.1, 200.17

[56] References Cited

U.S. PATENT DOCUMENTS

| | | | |
|---|---|---|---|
| 4,434,421 | 2/1984 | Baker et al. | 340/825.51 |
| 4,543,574 | 9/1985 | Takagi et al. | 340/825.5 |
| 4,785,396 | 11/1988 | Murphy et al. | 364/200 |
| 5,383,185 | 1/1995 | Armbruster et al. | 370/85.3 |
| 5,392,285 | 2/1995 | Kurts | 370/85.2 |
| 5,453,737 | 9/1995 | Opoczynski | 340/825.03 |
| 5,615,404 | 3/1997 | Knoll et al. | 395/882 |

*Primary Examiner*—Ayaz R. Sheikh
*Assistant Examiner*—Jigar Pancholi
*Attorney, Agent, or Firm*—Thomas, Kayden, Horstemeyer & Risley

[57] ABSTRACT

A slot token protocol for establishing and terminating datalinks over a serial bus shared by multiple devices with low overhead, no supporting hardware, a low collision rate, and fast collision resolution. Of the devices sharing the serial bus, one device is designated as the master device with the remaining devices being designated as slave devices. The master device is responsible for controlling allocation of the serial bus between each of the slave devices so that only one slave device controls the bus at a time. The master device achieves this by requiring slave devices to submit bus requests before the requesting slave device is allocated control over the serial bus. In addition, a busy bus line may be included to reduce the likelihood of a data collision on the serial bus by connecting the master an slave devices with a bus busy line and allowing a slave device to signal to the other slave devices over the bus busy line that it intends to transmit a bus request. A protocol manager associated with the master device and each slave device synchronizes the operation of the master and slave devices by the implementation of specific state logic. Further, the master device is responsible for resolving bus collisions when multiple slave devices attempt to transmit bus requests at the same time over the serial and their bus request collide.

18 Claims, 14 Drawing Sheets

CONTROL FRAME

DATA FRAME

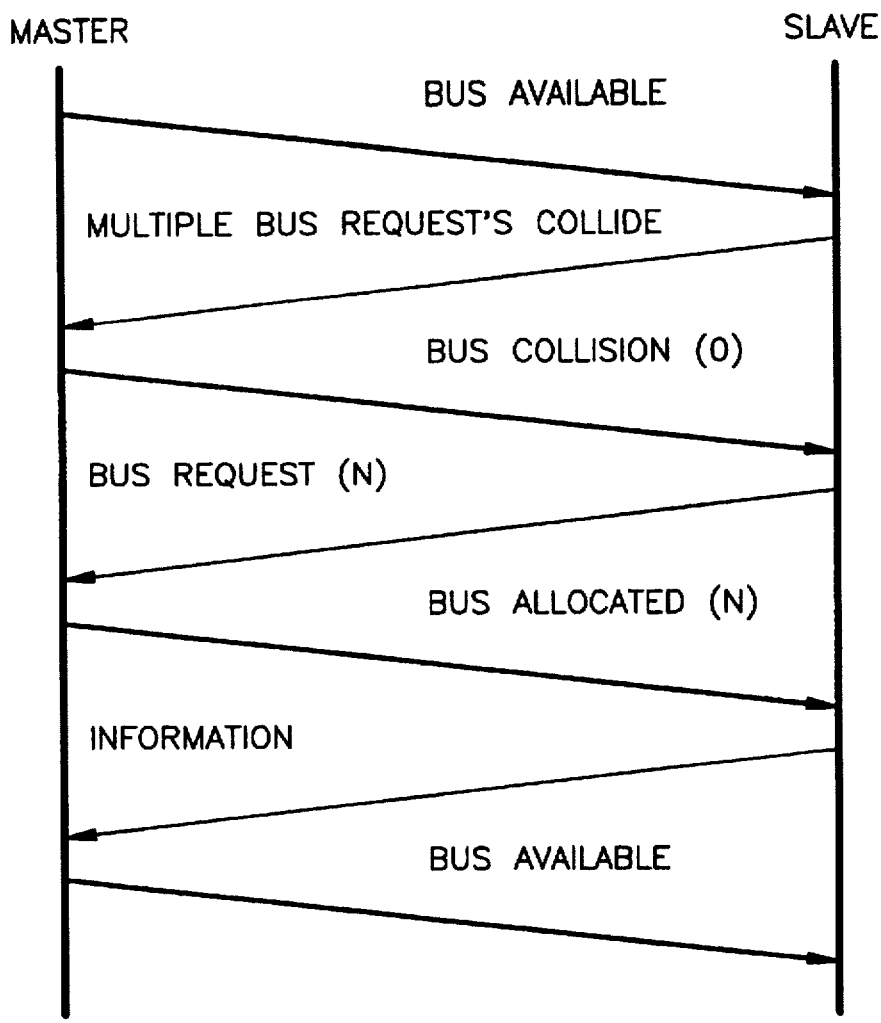
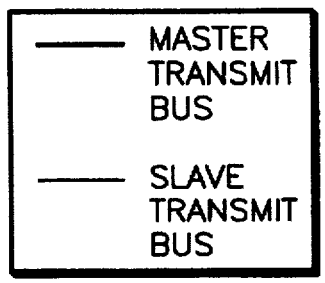
FIG. 11B 5,768,543

1
SLOT-TOKEN PROTOCOL

The present application is related to a patent application entitled "System and Method for Bus Contention Resolution," filed concurrently herewith by the same inventor and assigned to the same assignee as the present application.

FIELD OF THE INVENTION

This invention generally relates to computer systems that broadcast data over a serial bus that is shared between several devices, and more particularly, to a multi-point link control protocol for establishing and terminating data-links over a serial bus shared by several devices.

BACKGROUND OF THE INVENTION

The desire to provide greater and greater bandwidth over a single transmission line has spurred on the development of numerous new and improved transmission techniques with advanced communication hardware and software. In an effort to respond to the needs of growing businesses that are integrating offices which are geographically separated, in addition to the growing popularity of the Internet, increased bandwidth and broadcast quality have dramatically improved in recent years. For example, a 14.4 Kbps modem which provide amplitude modulate (AM) radio-quality sound and small jerky video is far from optimum when compared with the current transmission techniques being developed and implemented such as integrated services digital network (ISDN), asynchronous transfer mode (ATM), and asymmetric digital subscriber line (ADSL), all of which are capable of providing compact disk (CD) quality sound and broadcast quality video or better.

However, such technology is useless unless additional technology is available to support it. For instance, a business may have numerous high speed data transmission lines terminating at their office site in order to service their communication needs. However, in order to terminate the high speed transmission lines, the business must have an interface device capable of connecting the transmission lines to the terminal equipment at their office site, such as a computer terminal, a computer system or network, or a PBX.

An example of an interface device known to be used for terminating high speed transmission lines such as a T1 trunk line is a channel service unit\data service unit (CSU/DSU) device 2, as illustrated in FIG. 1. In general, a CSU/DSU device can be described as a piece of hardware with imbedded firmware for interfacing a T1 trunk line with data terminal equipment (DTE) located at a business site. A CSU/DSU device performs both CSU functions, such as interfacing the digital circuit of the T1 trunk line, and DSU functions, such as interfacing and subdividing the bandwidth of the T1 trunk line for connection to separate DTE. Because a typical business requires more than one T1 line, a carrier comprising up to sixteen T1 trunk lines is typically provided to a business site and terminated at a nest 3 of CSU/DSU devices. A nest comprises up to sixteen CSU/DSU devices (one for each T1 trunk line) integrated into a single housing in a side-by-side configuration. Further, a nest includes an user interface panel 4 for supporting management and integration of the CSU/DSU devices. Specifically, the user interface panel allows the user to perform various management functions on anyone of the CSU/DSU devices of the nest, usually one at a time.

To further support management and communication between the respective CSU/DSU devices and the external devices connected to the nest, one or more management channels 5 are implemented in the backplane assembly of the nest. These management channels are compressed of asynchronous serial buses that are connected to and shared between all the CSU/DSU devices of the nest. Across these management channels flow data from various source/destination devices such as a personal computer (PC) 7, a printer 8, or a network manager station 9. As shown in FIG. 1, the PC 7 and printer 8 are connected to one management channel and the network manager station 9 is connected to a separate management channel. The PC 7 may download an upgrade program used to re-program one of the CSU/DSU devices or may perform front panel emulation to allow the user to control one of the CSU/DSU devices from a remote location (the functional equivalent to standing at the user interface panel). The printer 8 may provide alarm reporting of problem with a T1 trunk line terminating at the nest or with one of the CSU/DSU devices. The network server manager 9 may provide network control. Note that it is desirable for a single management channel to be able to support multiple source/destination devices so that multiple operations can take place at the same time on one management channel.

Because the management channels 5 are shared by up to sixteen different CSU/DSU devices, a need exists for a multi-point protocol designed for coordinating the transmission of data over the shared serial buses of the management channel with the capability of detecting and resolving a data collision when multiple CSU/DSU devices broadcast data over a single serial bus and that data overlaps in time.

Numerous techniques have been proposed in the art for coordinating transmissions over a shared bus and for resolving data collisions on the shared bus. A brief discussion of several exemplary types of prior art schemes is set forth hereafter, though it should be noted that this discussion is not exhausted.

In a local area network (LAN), Ethernet may be utilized as a transmission media for carrying broadcast transmissions generated by the computers attached to the Ethernet. The computers attached to the Ethernet essentially listen for silence on the bus of the Ethernet before transmitting their data packets. When a data collision occurs on the Ethernet, the computers that transmitted the data detect the collision via hardware present at each computer on the network, and then retry their transmissions some short random time later. The hardware performing collision detection is typically embodied on a network card associated with each of the computers. In situations of heavy traffic on the Ethernet, this random delay before retry can cause significant network overhead with most transmissions resulting in collisions. This is a non-deterministic approach to the problem of data collision which requires specific hardware and performs poorly under very heavy network traffic conditions.

In a wide area network (WAN), a multi-point protocol may be used that does not incorporate polling. In this configuration, the slave units only transmit when they believe the bus is clear, detecting collisions as they occurred. The collision detection and resolution scheme performed here is performed in much the same manner as with a LAN.

Lastly, a leased-line modem typically utilizes a multi-point protocol such as advanced diagnostic protocol (ADP). This is a polled environment on a low-speed connection. Leased-line modems use a multi-point polling protocol to provide a centralized network diagnostic capability where test and status commands are given from a central network control facility. Each modem in the network polls its subordinate modems for responses to diagnostic commands previously sent. While this approach is fine for low-bandwidth testing, it would be very inefficient for sustained data transfer applications. For example, if a modem has 8 subordinate modems that it has connected to, and immediately after it polls the first modem for status the first modem generates a change in status, that modem has to wait for seven other modems to be polled for their status before it will get another opportunity to send its updated status. However, because this is a polled environment, there is no possibility of a collision on the shared network.

Although the techniques of the prior art have some merit, they do not provide a multi-point protocol, with low overhead, that is and capable of resolving bus collisions in a fast, deterministic manner without the requirements of hardware.

Thus, a heretofore unaddressed need exists in the industry for a datalink layer protocol for establishing and terminating data-links over a serial bus shared by several devices with low overhead, no supporting hardware, low collision rate, and fast data collision resolution.

SUMMARY OF THE INVENTION

The present invention overcomes the inadequacies and deficiencies of the prior art as described hereinbefore and is well known in the industry. The present invention provides for a slot-token protocol designed for operating on a serial bus shared by multiple devices for establishing and terminating links on the serial bus between the devices. For purposes of the present invention, a device is any device that requires to communicate over a serial bus that is shared among multiple devices of the same/similar type (e.g., in a central office, groups of modems, CSU/DSU's, or ISDN terminal adapters). The slot-token protocol of the present invention is a datalink layer protocol that is implemented at each device sharing the serial bus via a protocol manager. The protocol manager acts as a bus arbitrator, efficiently allocating control over the serial bus to one device at a time and quickly resolving any data collision occurring on the serial bus. In the preferred embodiment, the slot-token protocol of the present invention includes a protocol manager, a collision detection mechanism, and a collision resolution manager.

In accordance with the present invention, the protocol manager provided by the slot-token protocol is engineered to minimize the likelihood of a data collision on the shared serial bus and to prevent random delay in collision resolution. As a result, there is a calculable wort-case time to resolving any data collision. This is especially important when the serial bus is of low bandwidth, operating at or below 38.4 Kbps.

In architecture, the protocol manager of the present invention is configured in the memory associated with each of a plurality of devices sharing a serial bus. In the preferred embodiment, the devices are CSU/DSU devices sharing a management channel in a CSU/DSU nest. In the CSU/DSU nest, one CSU/DSU device is designated as the master and the remaining devices are designated as slaves. The management channel shared by the master device and the slave devices comprises two one-way serial buses. One of the serial buses is configured for transferring data from any one of the slave devices to the master device, and thus, is referred to as the slave transmit bus. The slave transmit bus is subject to data collisions because multiple slave devices may attempt to transmit data over it at the same time. The other serial bus is configured for transferring data from the master device to all of the slave devices, and thus, is referred to as the master transmit bus. The master transmit bus is not subject to data collisions because the master device is the only device transferring data over it.

The master device is responsible for coordinating the sharing of the slave transmit bus by the slave devices. This is achieved by requiring the slave devices to submit a bus request to the master device over the slave transmit bus. The master device then allocates control of the slave transmit bus to the requesting slave device or, if the bus request of multiple slave devices collide or the slave transmit bus, the master device resolves the bus contention. Therefore, the only possibility for a bus collision is on the slave transmit bus between two or more bus requests.

Worth noting at this point is that the master device and the slave devices are essentially identical with the exception that the master device includes the collision detection mechanism for detecting collisions on the slave transmit bus.

The present invention can also be thought of as a software program comprising executable (i.e., computer readable) instructions encoded on a memory medium associated with each CSU/DSU device of the nest so as to cause the CSU/DSU devices to function in the following manner. Initially, following startup, a slave device with data to transmit over the slave transmit bus sends a bus request to the master device over the slave transmit bus. By requiring the slaves to submit a bus request prior to transmitting their data, the present invention reduces the opportunity for data collision which is especially desirable on a low bandwidth serial bus. The master device, in response, allocates control over the serial bus to the requesting slave device so as to prevent the other slave devices from transmitting any data, even a bus request, over the serial bus until notified when the serial bus becomes available again. The master device communicates this information to the slave devices over the master transmit bus using a control frame, also referred to as a control packet, containing specific commands. Note that the slave device that is allocated control over the serial bus is only allowed to transmit one data frame, also referred to as a datagram, before the serial bus is made available for use by the other slave devices desiring to submit a bus request for transmitting their own datagrams. Accordingly, even though the physical connection from a slave device to the master device is continually changing ownership as the slave devices contend for the serial bus, the present invention hides this fact from the slave devices that believe they each have a permanent connection to the master device over the slave transmit bus.

An important feature of the present invention is that data collision are only possible on the slave transmit bus when more than one slave device transmits a bus request to the master device and the bus requests overlap in time. In such a case, the collision detection mechanism located at the master device detects the data collision and the collision resolution manager resolves the data collision on the slave transmit bus by identifying one of the colliding slave devices and allocating control over the slave transmit bus to that slave device.

In order to further reduce the likelihood of a data collision on the slave transmit bus, a bus busy line may be incorporated to interconnect the slave devices for allowing a slave device to indicate to the other slave devices its intention to submit a bus request to the master device. This bus busy line essentially reduces the window of opportunity for the bus request of two or more slave devices from overlapping in time.

An advantage of the slot-token protocol of the present invention is that it provides flexibility and expandability in the configuration of the CSU/DSU nest by being software-based and not hardware dependent.

Another advantage of the slot-token protocol of the present invention is that it provides a data-link layer protocol for a serial bus share by multiple devices with low overhead and a low collision rate.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Further, like referenced numerals designate corresponding parts throughout the several views.

FIG. 11A–11D are graphical illustration of the transmissions between a master device and a single slave device N in accordance with the operation of the present invention when the slave device N desires to transmit data over a serial bus shared with other slave devices.

DETAILED DESCRIPTION OF THE PREFERRED EMBODIMENT

1. Introduction

Figure 1:
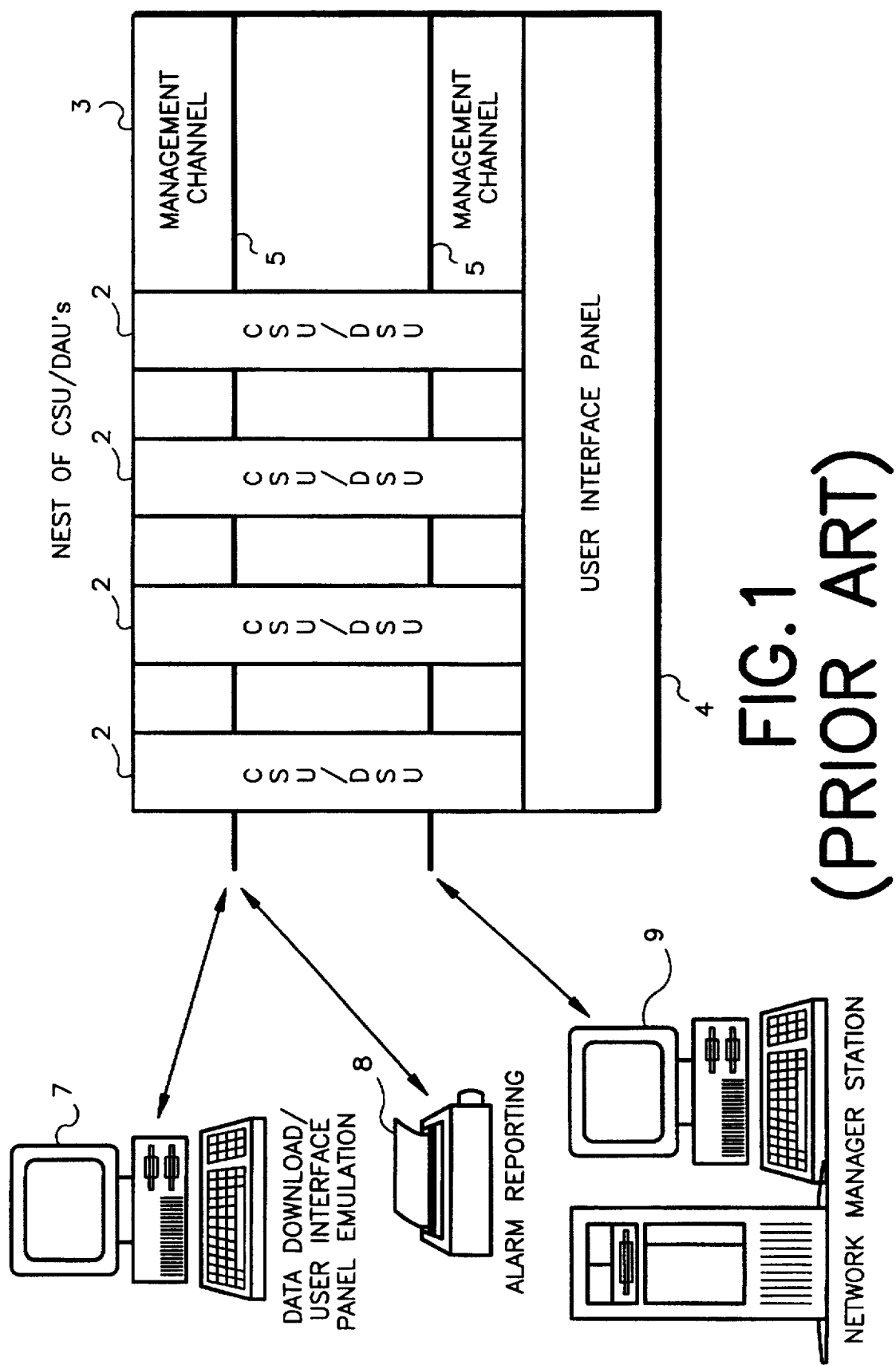
FIG. 1 is a schematic block diagram of a nest of CSU/DSU's, as found in the prior art, including two management channels interconnecting the CSU/DSU devices of the nest.

The following description is of the best presently contemplated mode of carrying out the present invention in the context of a nest of CSU/DSU devices having at least one serial bus shared by more than one of the CSU/DSU devices for broadcasting data as described in the Background section and as illustrated in FIG. 1. However, as can be appreciated by one of ordinary skill in the art, the present invention is equally applicable in other computer systems that broadcast data over a serial bus that is shared between multiple devices, thereby giving rise to the possibility of data collisions, such as central (interconnected) leased-line modems or ISDN devices. Thus, the present description is not to be taken in a limiting sense but is made merely for the purpose of describing the general principles of the present invention. The scope of the invention should be determined by referencing the appended claims.

A slot-token protocol in accordance with the present invention can be stored on any computer-readable medium for use in connection with any computer-readable system or method. In context with this document, a computer-readable medium is any electronic, magnetic, optical or other physical device or means that can contain or store a computer program for use by or in connection with a computer-related system or method.

2. Architecture

Figure 2:
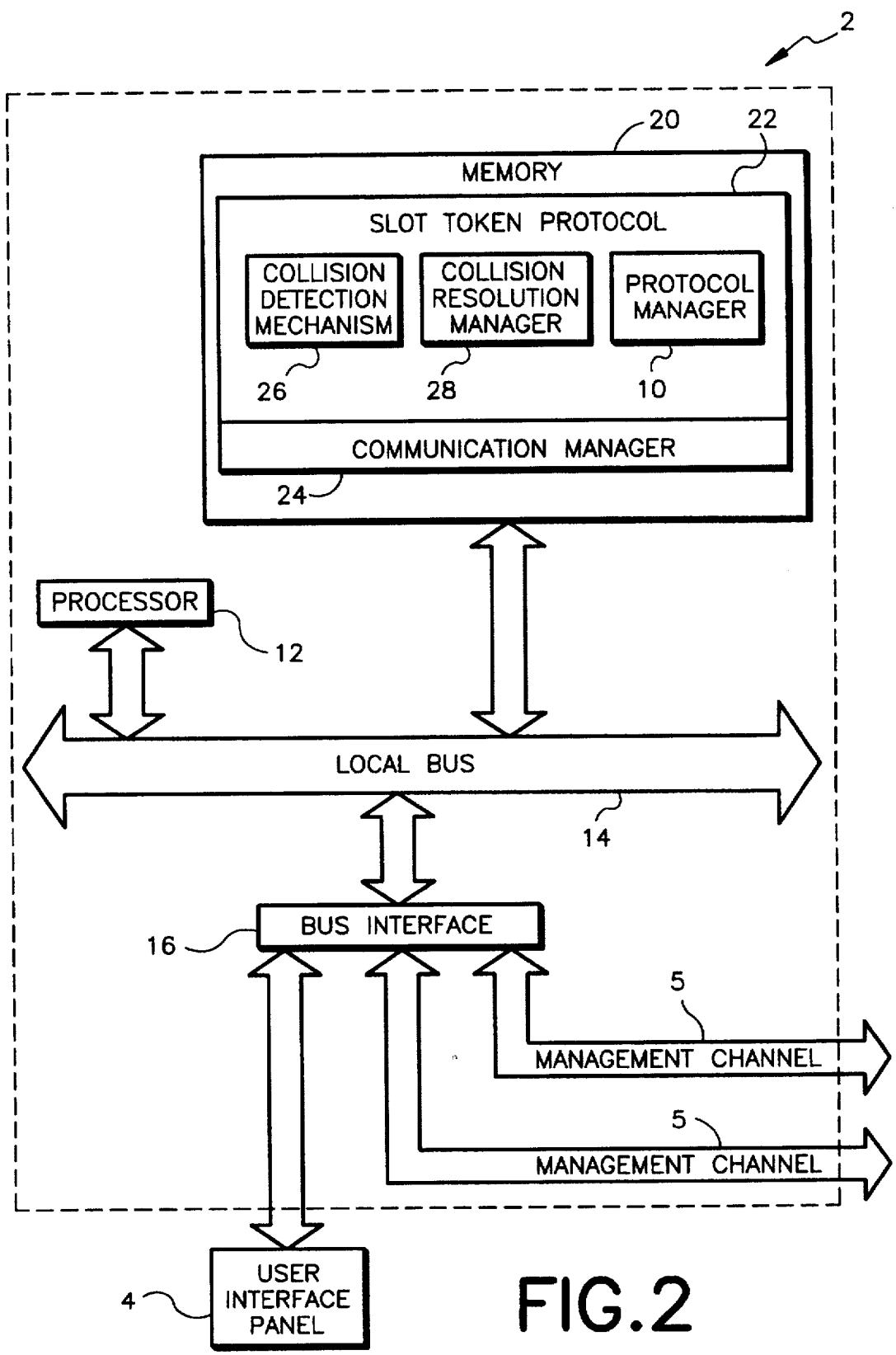
FIG. 2 is a block diagram of a protocol manager in accordance with the slot-token protocol of the present invention in the context of a CSU/DSU device.

As illustrated in FIG. 2, the slot-token protocol of the present invention is implemented by a protocol manager 10 within a CSU/DSU device 2. The CSU/DSU device 2 includes a processor 12 that communicates with other elements within the CSU/DSU device via a local bus 14. A bus interface 16 is provided to interface the CSU/DSU device 2 with a user interface panel 4 and one or more management channels 5. A memory 20 within the CSU/DSU device contains the slot-token protocol 22. It is noted that the slot-token protocol 22 is a datalink layer protocol which is merely one of several protocol layers comprising a protocol stack under the Open System Interconnect (OSI) standard. The additional layers comprising the protocol stack typically includes a lower physical layer and several upper layers including a network layer, a transport layer, a section layer, a presentation layer, and an application layer. For simplicity, aforementioned layers are not illustrated in FIG. 2 though it would be apparent to one of skill in the art implementing a protocol stack that such layers exist and are required for the operation of the CSU/DSU device.

A collision detection mechanism 26 is also provided as a part of the slot-token protocol 22. The collision detection mechanism 26 enables the processor 12 to detect data collisions on the management channels 5 which are shared by multiple CSU/DSU devices as discussed in the Background section. In the preferred embodiment, this achieved using serial communication channel (SCC) framing error indication and software validation, as is described in greater detail below. Further, a collision resolution manager 28 is also provided as a part of the slot-token protocol 22 for resolving data collisions on a management channels 5 as is described in detail below. The operation and functionality of both the collision detection mechanism 26 and the collision resolution manager 28 are controlled and imparted by the protocol manager 10. It is noted that schemes for collision detection and/or collision resolution other than that described in connection with the preferred embodiment may be equally employed with the protocol manager 10 of the present to achieve the functionality and desirable results of the slot-token protocol as discuss herein.

Figure 3:
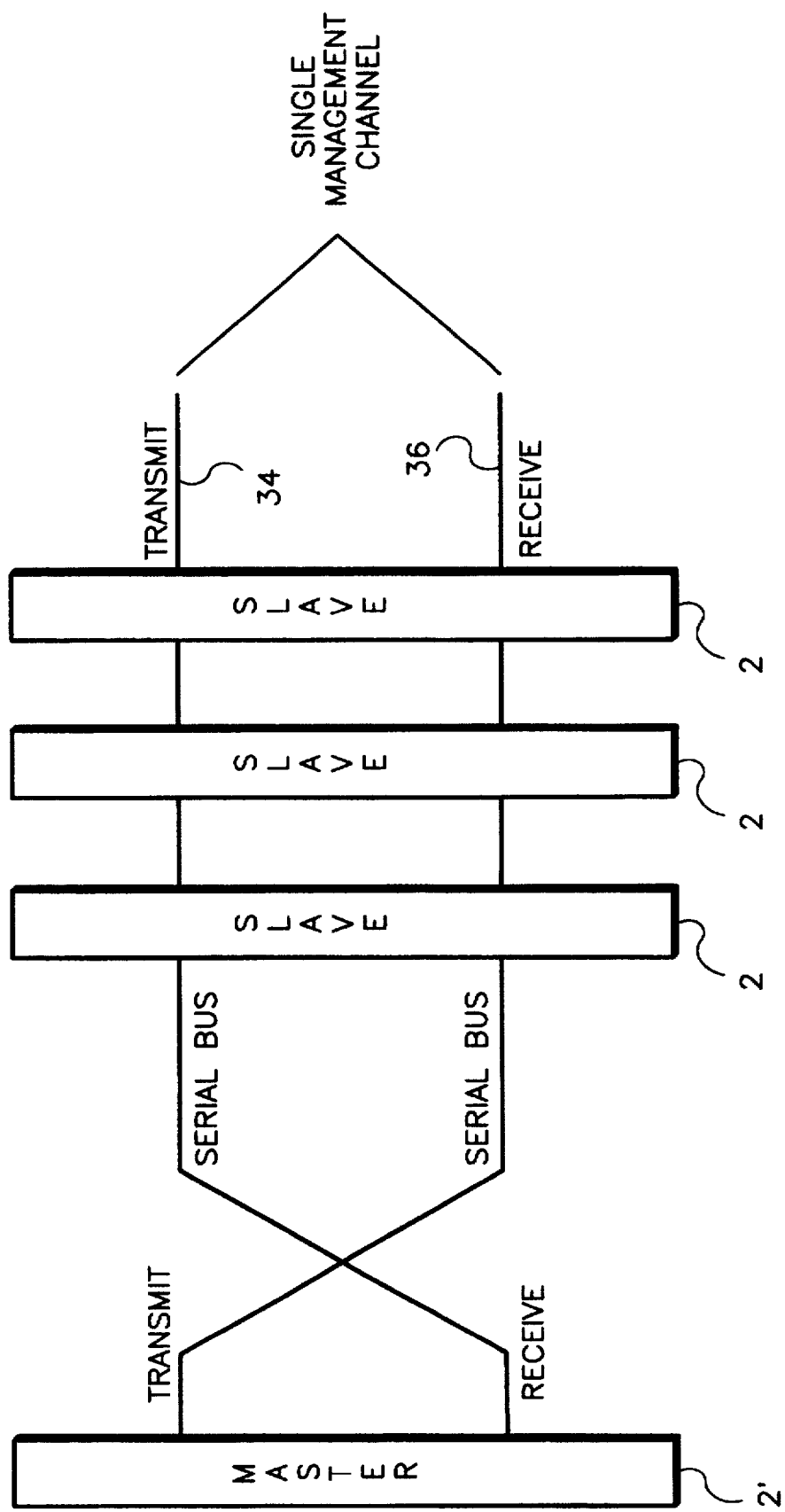
FIG. 3 is a block diagram illustrating the connection between the master and slave devices of the present invention by the two serial buses comprising a management channel.

A requirement of the present invention is that one, and only one, of the CSU/DSU devices be designated, per management channel 5, as a master device 2' and the remaining devices be designed as slave devices 2, as shown in FIG. 3. Although the same device can be configured as the master device 2' for more than one management channel 5, this is not desirable due to the processing overhead incurred. For purposes of clarity, it is noted at this point that the slot-token protocol 22 only exists within the nest 3 (FIG. 1) and does not travel outside the nest to the connected external devices such as a PC 7, printer 8, or network manager station 9. Additionally, the external devices connect to the nest 3 do so through the master device 2'. Thus, the master device 2' is responsible for receiving data that is destined for the slave devices 2 and then sending data to the correct slave device 2. In addition, the master device 2' is also responsible for relaying transmissions from any slave device 2 to the appropriate external device.

The inter-connection architecture of the master device 2' and the slave devices 2 for a single management channel 5 is illustrated in FIG. 3. Note that the management channel 5 comprises two one-way serial buses including a slave transmit bus 34 shared by the slave devices for transmitting data and a master device and a master transmit bus 36 used by the master device to transmit data to the slave devices. It is important to note that in the context of the present invention all the transmissions are broadcast on the reeve buses 34, 36. Further, the two buses 34, 36 are crossed so that when the master device 2' transmits data, that data is received by all the slave devices 2, and when any one of the slave devices 2 transmits data, that data is received by the master device 2'. In this configuration, the master device 2' is the only device that receives the transmissions from the multiple slave devices 2 sharing slave transmit bus 34. An advantage of this is that the only bus with the possibility of a data collision is the slave transmit bus 34. Thus, the master device 2' can detect the data collision on the slave transit bus 34 via the collision detection mechanism 26 and then utilized the master transit bus 36 to interact with the slaves devices 2 in order to resolve the collision in the manner described below. Accordingly, one of skill in the art will recognize that the collision detection mechanism 26 need only be implemented in the master device 2'.

Figure 4A:
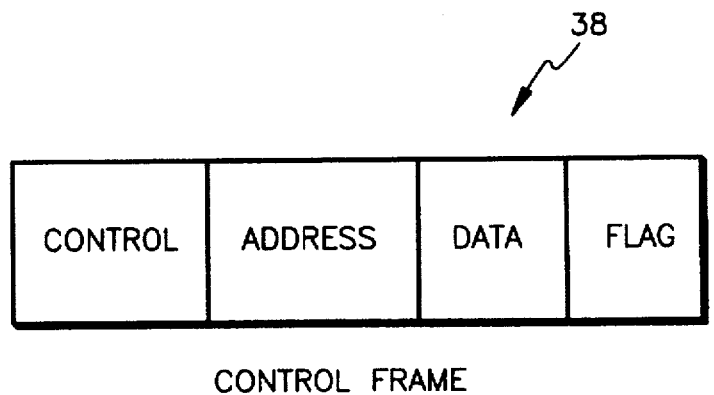
FIG. 4A is a block diagram of a control frame in accordance with the present invention.
Figure 4B:
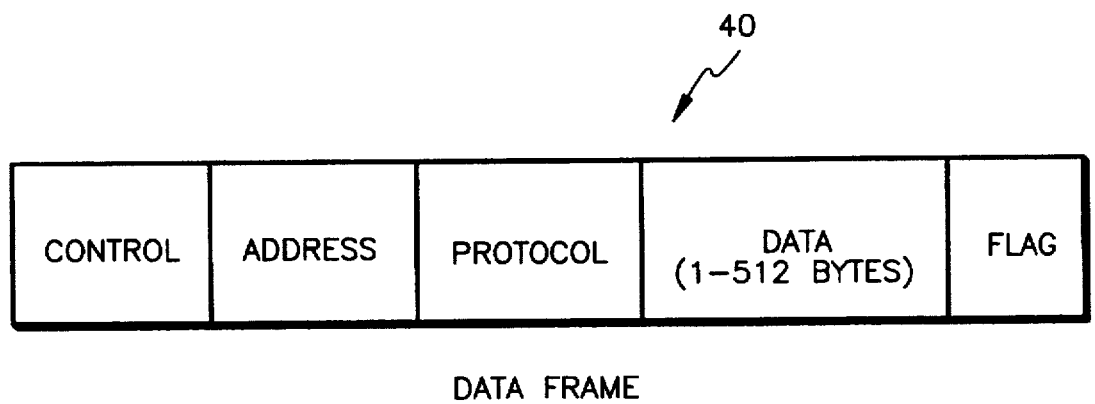
FIG. 4B is a block diagram of a data frame in accordance with the present invention.

The present invention utilizes two different frame structures for transmitting data across the slave transmit bus 34 and the master transit bus 36. Specifically, a control frame 38, illustrated in FIG. 4A, is used for transmitting control packets between the slave devices 2 and the master device 2'. In addition, a data frame 40, as illustrated in FIG. 4B, is used for sending datagrams across the slave transmit bus 34 between a single slave device 2 and the master device 2'. With reference generally to FIGS. 4A and 4B, the control field in both the control frame 38 and data frame 40 may be selected from anyone of the following identifiers: information, bus request, bus available, bus allocated, bus collision, no request, and bus reset. The following summation of each of the aforementioned identifiers is provided for reference purposes.

The information identifier is used in a data frame to indicate the frame which contains real data i.e., a datagram. The best request identifier is used in the control frame 38 by a slave device 2 when the slave device wishes to contend for the bus. The bus available identifier is transmitted by the master device 2' as a part of a control frame 38 when the slave transmit bus 34 becomes available. The bus allocated identifier is used by the master device 2' as a part of a control frame 38 once the master device has allocated the bus to a single slave device. The bus collision identifier is used by the master device 2' as a part of a control frame 38 when the master device detects a bus collision during a time in which it expects slave devices to transmit bus request control frames 38. The no request identifier is used by the master device 2' as a part of a control frame 38 when the master device has not received a control packet from one of the slave devices when one is expected. Lastly, the bus reset identifier is used by the master device 2' in a control frame 38 whenever the master device 2' wants to initialize all slave devices to a reset state.

The address field in both the control frame 38 and data frame 40 will indicate, for messages originating from the master device 2', whether the control packet is a broadcast or whether it is directed to a particular slave device identified by a slot number. When the slave devices transmit to the master device 2', the address field in both the control frame 38 and data frame 40 will indicate the particular slot number of the sending slave device.

The protocol field is used by higher layers in the OSI model to determine how to route a datagram containing real information within the context of the OSI stack and the software clients that receive and process slot-token protocol datagrams.

The data field is filled with particular control data being transmitted between the master device 2' and slave devices 2'. In the control frame 38, the data field may be omitted depending upon the particular control identifier. For instance, in the preferred embodiment, the only control identifiers used with the control frame 38 that include data field are the bus collision and no request identifiers. The remaining identifiers in a control frame 38 omit the data field. In a data frame 40, the data field is preferably DLE-Shielded, which is a standard method for ensuring transparency of control chats that appear in the data portion of a packet. The data that is DLE shielded is guaranteed not to contain characters that are considered to be control characters in the protocol. In the slot-token protocol, the only control character is the flag characters. In the preferred embodiment, the data field of data frame 40 can be anywhere from 1 to 512 bytes.

In accordance with the functionality of the master device 2', the master device 2' acts as a bus arbitrator for allocating control over the slave transmit bus 34 to one slave device 2 a time because the slave devices have no way of knowing when their transmissions collide with the transmissions of other slave devices sharing the slave transmit bus 34. This particular functionality of the master device 2' is imparted by the protocol manager 10 (FIG. 2) of the master device 2' and each of the slave devices 2. The state machine manager 10 of each device is responsible for providing the finite state machines that define the operation of the master device 2' and the slave devices 2 as data links are being established and terminated and bus collisions resolved. In essence, the protocol manager 10 of the present invention is the function-imparting component of the slot-token protocol.

3. State Machines of the Protocol Manager

Figure 5:
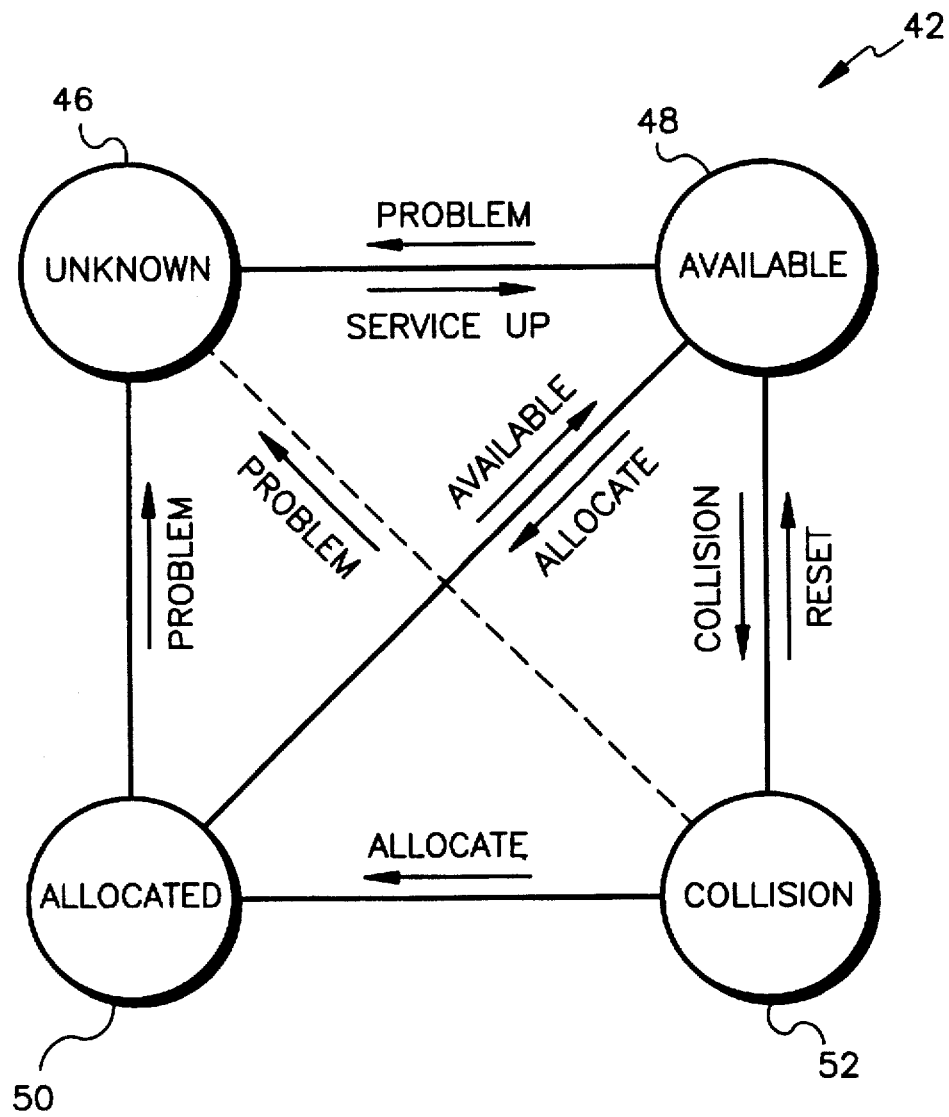
FIG. 5 is a receive state transition diagram of the master device of FIG. 3.
Figure 6:
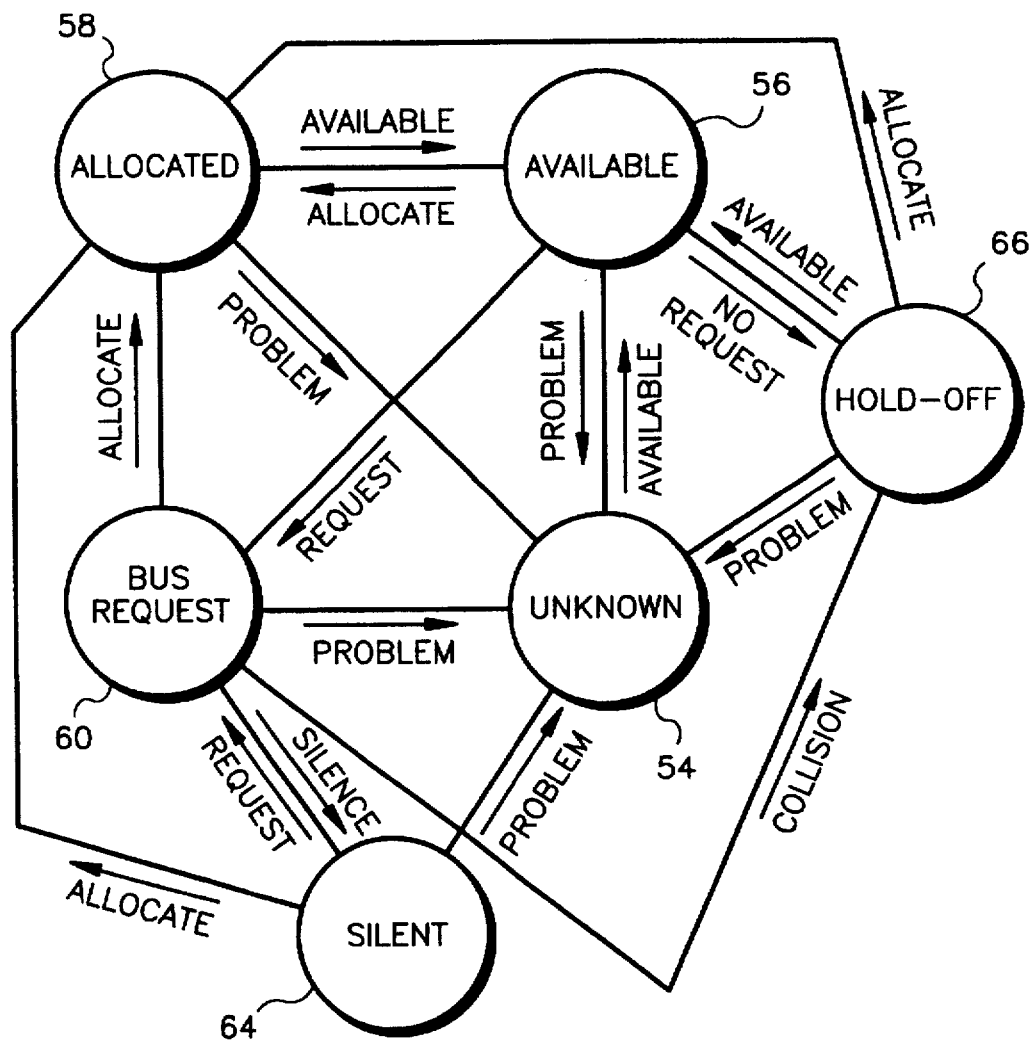
FIG. 6 is a transmit state transition diagram of a slave device of FIG. 3.

FIG. 5 shows a master received state machine 42 in accordance with the present invention for implementation at the master device 2', and FIG. 5 shows a slave transit state machine 44 in accordance with the present invention for implementation at each of the slave devices 2. The master receive state machines 42 is implement via the protocol manager 10 of the master device 2' and the slave it state machine is implemented via the protocol manager 10 of each slave device 2. Thus, the master receive state machine 42 and the slave transmit sate machine 44 interoperate to control the transmission activity over the serial bus 34 for establishing and terminating datalinks thereover and for resolving bus collisions thereon. Therefore, the master receive state machine 42 and the slave transmit state machine 44 allow the master device 2' and the slave devices 2 to agree on the link state of the slave transmit bus 34 during operation as described hereafter.

In regard to the master received state machine 42, its primary purpose is to maintain the actual link state of the slave transmit bus 34 (as viewed from the slave device's perspective) so that the master device 2' can correctly and efficiently mange the allocation of the slave transmit bus 34 to a one slave device 2 at a time. Thus, the master received state machine 42 only addresses data received by the master device 2'. Since the master device 2' is the only device transmitting on the master transit bus 36, there is no requirement to implement a state machine for the data transmitted by the master device 2'. The master received state machine 42 provides the following four states, as labeled in the respective circles in FIG. 4: an Unknown state 46, an Available state 48, an Allocated state 50, and a Collision state 52. The Available state 48 indicates that no slave device 2 owns the slave transmit bus 34 and that any slave device 2 may request the slave transmit bus. The Collision state 52 indicates that multiple slaves devices 2 have collided on the bus and that the master device 2' is attempting to resolve the collision. The equivalent states in the slave devices 2, as provided in FIG. 5, are a Silent State 64 and a Hold/Off State 66. The Allocated state 48 indicates that the master device 2' has allocated the slave transit bus to a single slave device 2. In this state, all of the slave devices 2 must remain off the bus until the bus state urns to the Available state. Lastly, the Unknown state 46 is entered into on device power-up when the protocol manager 10 needs to re-initializing (typically due to an internal error during operation).

The events that cause a transition from one state to another state are denoted by arrows indicating the direction of the state transition in response to the particular event indicated. Table I below provides a Master State Matrix listing the possible events and resulting transitional action. The Master State Matrix is utilized by the protocol manager 10 to implement the master received state machine 42.

On initialization, the first state is the Unknown state 46. Once the system is initialized and the slave transmit bus 34 has been configured for operation, a service-up event is generated and sent up the protocol stack of the slot-token protocol 22. Until this event arrives, the master device 2' will not attempt to make use of the slave transmit bus 34 and will not react to any other spurious events that may be received. In response to the service-up event, a control packet is broadcast to slave devices 2 and the state transitions to the Available state 48. The service-up event is only expected in the Unknown state 46 which is the first state entered when the master device 2' is reset and the up will be ignored by all other states.

A request event is generated whenever a slave device 2 requests the slave transmit bus 34 for transmitting data by sending a bus rest control packet to the master device 2'. The master device 2' processes this request by first determining whether or not a bus collision has occurred. In part, this is determined by the master device 2' performing a validation check on the received control packet to ensure that it was received in full. If a bus collision is identified by the collision detection mechanism 26, a collision event is generated and the appropriate action is taken by the master device 2' as is discussed in detail below. If a collision is not detected, the master device 2' transitions into an Allocated state 50.

When a collision is detected and a collision event generated, the collision resolution manager 28 of the master device 2' is initialized. Each time the master device 2' is

TABLE I

Master State Matrix

| Event/State | Unknown | Available | Collision | Allocated |
|---|---|---|---|---|
| ServiceUp | Process ServiceUp then transition to "Available" state | Ignore | Ignore | Ignore |
| Request | Ignore | Process Request and if no collision occurred generate "Allocate" event else generate "Collision" event | Process Request and if no collision occurred generate "Allocate" event else generate "Collision" event | Ignore |
| Collision | Ignore | Process Collision and transition to "Collision" state | Process Collision | Generate "Reset" event |
| NoRequest | Ignore | Generate "Problem" event | Process NoRequest | Generate "Problem" event |
| Allocate | Ignore | Process Allocate then transition to "Allocated" state | Process Allocate then transition to "Allocated" state | Generate "Problem" event |
| Available | Ignore | Process Available | Generate "Problem" event | Process Available then transition to "Available" state |
| Reset | Ignore | Process Reset | Process Reset then transition to "Available" state | Process Reset then transition to "Available" state |
| Information | Ignore | Generate "Reset" event | Generate "Reset" event | Process Information then generate "Available" event |
| ServiceDown | Ignore | Transition to "Unknown" state | Transition to "Unknown" state | Transition to "Unknown" state |
| Destroy | Ignore | Transition to "Unknown" state | Transition to "Unknown" state | Transition to "Unknown" state |
| Timeout | Ignore | Process Timeout, then generate "Available" event | Process Timeout then generate "BusNoRequest" event | Process Timeout then generate "Available" event |
| Problem | Reset System | Reset System | Reset System | Reset System |
| Any Other Event | Ignore | Ignore | Ignore | Ignore | called on to resolve a collision. the collision resolution manager 28 uses a divide and concur algorithm whereby retry subsets of the slave devices are selected to retry their bus requests until a retry subset is select which includes only one slave device that was a part of the original collision. That slave device is then allocated control over the slave transmit bus 36 and allowed to transmit its data. During the collision resolution process. the master device 2' packages its selection information in a collision control packet which is sent to the slave devices 2. In addition, during the collision resolution process. the master device 2' is changed to the Collision state 52.

While in the Collision state 52. the collision resolution manager 28 repeatedly selects and requests smaller and smaller retry subsets of the slave devices 2 to retransmit their bus request control packet. It is possible at this time for the master device 2' to select a retry subset of slave devices 2 that does not contain a slave that was a part of the original bus collision. In this case, no slave device 2 will respond and the master device 2' will timeout. If the master device 2' times out, it generates the no request event in order to continue the collision resolution process. Note that the master device 2' remains in the Collision state 52 until the collision resolution manager 28 resolves the bus contention.

The allocate event is generated when the mater device 2' receives a valid bus request from a single slave device 2. This event causes the master device 2' to transmit an allocated control packet to all slave devices 2 indicating that the slave transmit bus has been allocated and to which slave device 2 it has been allocated. Note that once the slave transmit bus has been allocated, the slave device 2 is only allowed to transmit a single data packet to the master device 2' before the master device 2' makes the bus available again. In response to this event, the master receive state machine changes to the Allocated state 50.

An available event is generated when the master device 2' determines that the particular slave device 2 that has control over the slave transmit bus 34 has completed transmission of its single data packet (i.e., datagram) to the master device 2'. This event causes the master device 2' to transmit an available control packet to all the slave devices over master transmit bus 36 indicating that the bus is now available. As a result of this event, the master device 2' transitions into the Available state 48.

A reset event is generated when an internal error condition is detected and causes the master device 2' to believe that a software error has occurred and that the state machines 42,44 are in an inconsistent state. This event cause the master device 2' to transmit a bus reset control packet to all slave devices 2 which commands them to reset to the Available state 48, as does the master device 2'.

Within the Allocated state 50, the master device 2' is only expecting a data packet from a single slave device 2. Once the master device 2' has received a complete data packet from the slave device 2 that had control of the slave transit bus 34 an information event is generated. The master device 2' processes this event by sending the data packet's content to other elements of the nest that can send the data, such as, up the protocol stack or directly to a client. An available event is then generated as described hereinbefore.

A service down event is generated when the master device 2' detects that the slave transmit bus 34 has become available for use, possibly due to a hardware problem or due to a temporary need to prevent all slave devices 2 and the master device 2' from using the slave transit bus 34. In response to this event, the master deice 2' transitions into the Unknown state 46.

A destroy event is received from other software elements in the nest to indicate that the system is shutting down, or has no further need for the state machines 42, 44. In response to this event, the master device 2' transitions into the Unknown state 46.

The master device 2' sets a timer prior to transmitting certain control packets to the slave devices 2 to ensure that the state machines 42, 44 remain alive, even if the unexpected events were not received from the slave devices 2. In the preferred embodiment, the master device 2' has timeouts for essentially three purposes: (1) to determine that there is no slave request activity while in the Collision state 52; (2) to determine that there is not response from a slave that had the bus allocated to it while in the Allocated state 50; and (3) to determine that no slave request activity took place while in the Available state 48. While in the Collision state 52, the master device 2' is attempting to resolve a bus collision using the divide and concur algorithm of the present invention. There is a chance during bus collision resolution that a retry subset of slaves selected by the collision resolution manager 28 will not include a slave device 2 that was a part of the original pending group. If so, no response will be received when the master device 2' sends either the collision control packet or the no request control packet to the slave devices 2. As a result, a timeout will occur, preferably after 30 milliseconds, and the master device 2' will try another retry subset of slave devices 2 by generating a no request event. In the Allocated state 50, if a timeout occurs, preferably set at the maximum slave device transmit time, this means that the slave device 2 did not complete its data transmission. This is usually a result of being pulled out of the carrier nest. In this case, the master device 2' will simply announce that the bus is available by generating an available event. In the Available state 48, if the timeout occurs this means that no slave device 2 has sent anything to the master device 2' for a predetermined length of time, preferably 10 seconds. In this case, the master device 2' will generate the available event and send another available control packet to the slave devices 2. This "heart-beat control" packet is intended to notify any recently inserted slave device as to the current bus state, since no slave device is allowed to request the bus until it knows for certain that the slave transmit bus is available. In whichever of the three circumstances described above, when the timer expires, the master device 2' generates the timeout event and processes it according to the Master State Matrix above.

A problem event is generated when the master device 2' has detected a hardware problem. This is usually not recoverable, so transitioning into the Unknown state 46 is not sufficient. Consequently, the hardware is usually reset.

In regard to the slave transmit state machine 44, its primary purpose is to maintain the actual link state of the slave transmit bus 34 (as viewed from the slave device's perspective) so that the slave device 2 can cooperatively transmit on the shared slave transmit bus 34 only at the appropriate times. Thus, the slave transmit state machine 44 only addresses data transmitted by the slave devices 2. Because the master device 2' is the only device transmitting on the master transmit bus 36, there is no requirement to implement a state machine for the data received by the slave devices 2. The slave transmit state machine 44 provides six states as labeled in the respective circle in FIG. 5: an Unknown state 54, an Available state 56, an Allocated state 58, a Bus Request state 60, a Silent state 62, and an Hold-Off state 66. The Available state 56 indicates that no slave device 2 owns the bus and that any slave device 2 may request the bus. The Silent state 64 and Hold/Off state 66 indicate that multiple slaves devices 2 have collided on the bus and that the master device 2' is attempting to resolve a collision. The Allocated state 58 indicates that the master device 2' has allocated the bus to a single slave device 2. In this state, all of the slave devices 2 must remain off the bus until the bus state returns to the Available state. The Unknown state 54 is entered into on device power-up and when the protocol manager needs re-intializing, typically due to an internal error during operation. The Bus Request state 60 is entered whenever a slave device requests the slave transmit bus, which it does by transmitting a bus request control packet to the master device.

An available event occurs when the slave devices 2 receive a control packet from the master device 2 indicating that the slave transmit bus 34 is now available. At this time, any slave device 2 is free to request the slave transmit bus 34. If one of the slave devices 2 has data to transmit to the master device 2', it may immediately request the slave transmit bus 34 by transferring to the Bus Request state 60. In addition, the requesting slave device 2 must also reset its no activity timer at this time in order to protect against a condition where the master device does not respond within the designated amount of time.

A request event is generated internally by a slave device 2 when it has data to transmit to the master device 2' and the

TABLE II

Slave State Matrix

| Event/State | Unknown | Available | Request | Silent | Allocated | Holdoff |
|---|---|---|---|---|---|---|
| Available | Process Available and transition to "Available" state | Process Available | Process Available and transition to "Available" state | Process Available and transition to "Available" state | Process Available and transition to "Available" state | Process Available and transition to "Available" state |
| Request | Ignore | Process Request and transition to "Request" state | Process Request | Process Request and transition to "Request" state | Error - Reset System | Ignore |
| Silent | Ignore | Error - Reset System | Transition to "Silent" state | Error - Reset System | Error - Reset System | Error - Reset System |
| Collision (as detected by slave) | Ignore | Ignore | Transition to "Holdoff" state | Ignore | Ignore | Ignore |
| Collision | Ignore | Process Collision and transition to "Holdoff" state | Process Collision and if this slave is allowed to retry generate a "Request" event, else generate a "Silent" event | Ignore | Ignore | Ignore |
| NoRequest | Ignore | Process NoRequest and transition to "Holdoff" state | Generate "Silent" event | Process NoRequest and if this slave is allowed to retry then generate a "Request" event | Ignore | Ignore |
| Allocate | Ignore | Process Allocate and transition to "Allocated" state | Process Allocate and transition to "Allocated" state | Process Allocate and transition to "Allocated" state | Ignore | Process Allocate and transition to "Allocated" state |
| Reset | Process Reset | Process Reset and transition to "Unknown" state | Process Reset and transition to "Unknown" state | Process Reset and transition to "Unknown" state | Process Reset and transition to "Unknown" state | Process Reset and transition to "Unknown" state |
| ServiceDown | Ignore | Transition to "Unknown" state | Transition to "Unknown" state | Transition to "Unknown" state | Transition to "Unknown" state | Transition to "Unknown" state |
| Destroy | Ignore | Transition to "Unknown" state | Transition to "Unknown" state | Transition to "Unknown" state | Transition to "Unknown" state | Transition to "Unknown" state |
| Timeout | Ignore | Process Timeout and transition to "Unknown" state | Process Timeout and transition to "Unknown" state | Process Timeout and transition to "Unknown" state | Process Timeout and transition to "Unknown" state | Process Timeout and transition to "Unknown" state |
| Problem | Reset System | Reset System | Reset System | Reset System | Reset System | Reset System |
| Any Other Event | Ignore | Ignore | Ignore | Ignore | Ignore | Ignore | slave transmit bus is available. In this case, the slave device 2 sends a request control packet to the master device 2' and transitions to the Bus Request state 60.

A silence event is generated internally by a slave device 2 when it is in the process of requesting the slave transmit bus 34, but the master device 2' has indicated that it should not participate in the next retry of requesting slave devices for control of the slave transmit bus 34. This, in essence, means that a slave device generating a silence event was a part of the original collision but is not a part of the selected retry subset that is allowed to resubmit their bus request to the master device 2'.

A collision event is received from the master device 2' when a collision is detected by the collision detection mechanism 26. Once the bus collision is detected, the master device 2' transmits a collision control packet to all slave devices 2. The slave devices 2 in the Available state 56 (i.e., it has nothing to transmit) then transition to the Hold/Off state 66 to prevent them from adding to the bus contention. If a slave device 2 is in the Bus Request state 60, (i.e., that slave has something to transmit), it will examine the collision packet from the master device 2' to determine whether or not it may resend its request (i.e., it is within the selected retry subset of slave devices 2). This process of bus collision resolution as controlled by the collision resolution manager 28 is described in greater detail below. If the slave device 2 determines that it may resend its request, it does so immediately, otherwise it generates a no request event as described below, which causes it to transition to the Silent state 64.

A no request event is received from the master device 2' when, during bus collision resolution, the master device 2' selects a retry subset of slaves that does not contain a slave device that wishes to request the bus, that it, was not a part of the original collision. In this case, no slave device 2 will respond and the master device 2' will time out. When the master device times out, it sends a no request control packet to all slave devices 2. Thus, if a slave device is in the Bus Request state 60, it must generate a no request event to transition to the Silent state 64.

An allocated event is received from the master device 2' when an allocated control packet is received by all the slave devices 2 indicating that the slave transmit bus 34 has been allocated to a specific slave device 2 and to which slave device 2 it has been allocated. In this case, all slave devices other than the one receiving control over the slave transmit bus 34, transition to the Allocated state 58, and only the new bus owner is allowed to finish transmission of a single data packet (i.e., datagram) to the master device 2'.

A reset event is received from the master device 2' when an internal error condition is detected that causes the master device 2' to believe that a software error has occurred and that the state machines 42,44 are in an inconsistent state. This event causes the master device 2' to transmit a bus reset control packet to all the slave devices 2 which commands them to reset the Available state 56, as does the master device 2'.

The service down event is generated when the master device 2' detects that the slave transmit bus has become unavailable for use, possibly due to a hardware problem or due to a temporary need to prevent all slave devices 2 and the master device 2' from using the slave transmit bus 34. In this case, the slave transmit state machine 44 transitions to the Unknown state 54.

A destroy event is received from other software elements in the system and indicates that the system is shutting down, or has no further need for the state machines 42,44.

The slave devices 2 preferably use a timeout only to determine the existence of bus failures or a master device 2' failure. Typically this would be caused by the master device 2' being pulled out of the carrier nest. Thus, the timer of each of the slave devices 2 is set prior to transmitting certain control packets to the master device 2' in order to ensure that the state machine 44 operation remains alive, even if the expected events are not received by the master device 2'. When the timer expires, the slave device 2 win enter the Unknown state 54 and remain there until the master device 2' generates an available control packet. On the entry to the Unknown state 54, a service down message win be sent up the protocol stack. When an available control packet finally arrives from the master control device 2', a service up message is sent up the protocol stack and the slave device 2 transitions into the Available state 56.

A problem event is generated when a slave device 2 detects some hardware problem. This is usually not recoverable so transitioning to the Unknown state 54 is not sufficient. This usually requires the hardware to be reset.

Thus, the protocol manager 10 implements the master receive state machine 42 at the master device 2' and the slave transmit state machine 44 at the slave devices 2, as described above in conjunction with the Master State Matrix and the Slave State Matrix, respectively, to provide a low collision rate over the slave transmit bus 34 with low overhead.

4. Bus Busy Signal

Figure 7:
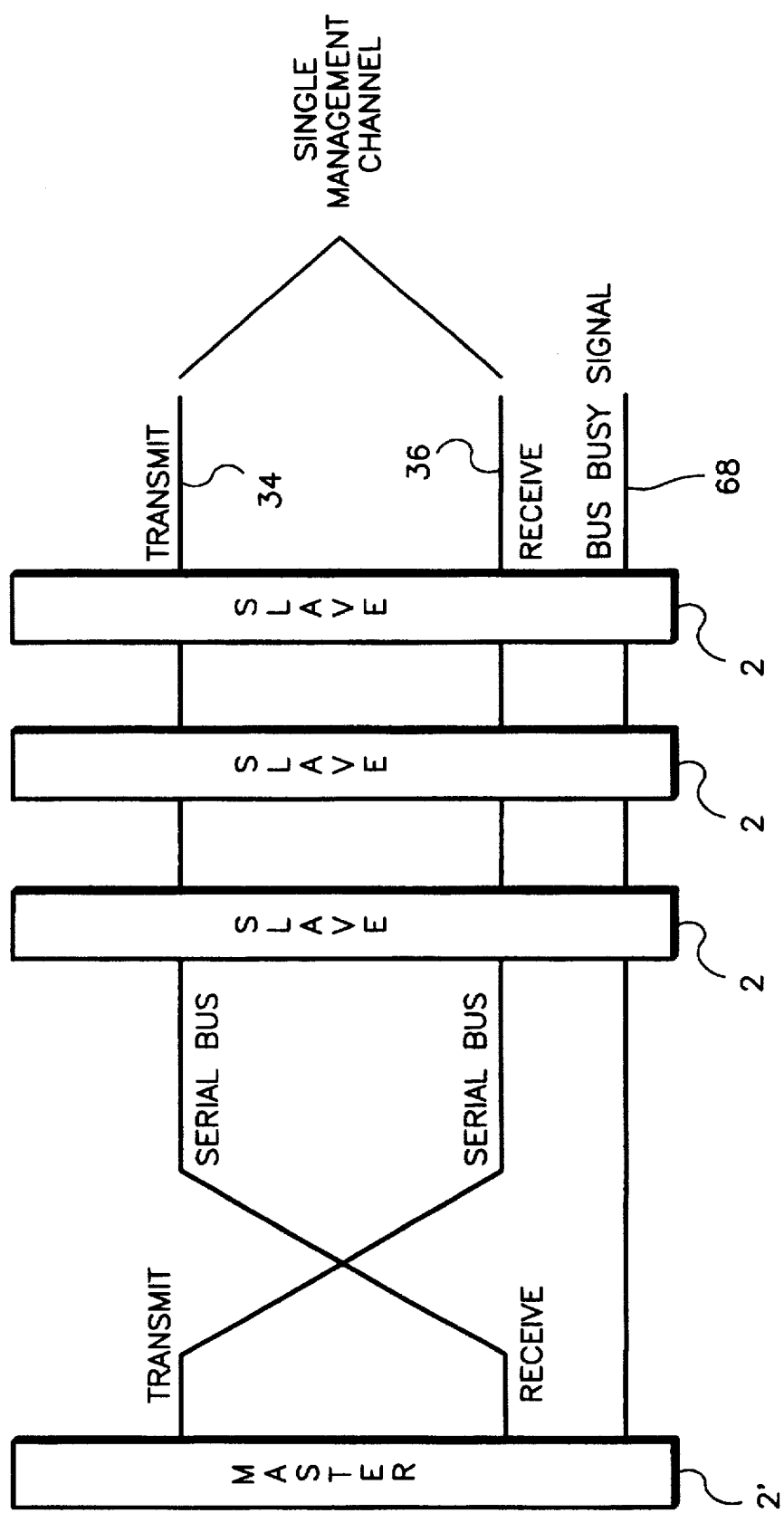
FIG. 7 is a block diagram illustrating the connections of a bus busy line between the master and each of the slave devices of FIG. 3.

In order to further reduce the likelihood of a data collision on the slave transmit bus 34, an alternative interconnection architecture is illustrated in FIG. 7 is proposed whereby a bus busy line 68 is provided. The bus busy line 68 is connected to all of the slave devices 2 and the master device 2' within the nest 3. The purpose of the bus busy line 68, and the bus busy signal transmitted thereover, is to allow for any slave device 2 to indicate its intent to transmit on the slave transmit bus 34. Any time that a slave device 2 asserts and then de-asserts a bus busy signal over bus busy line 68, all the other slave devices 2 in the nest 3 generate a hardware interrupt. This hardware interrupt is processed by the receiving slave devices 2 in a very short period of time and can be used to greatly reduce the chances that multiple slave devices 2 win collide when a slave device transmits a bus request over slave transmit bus 34. Note that the interrupt does not occur when a slave device 2 merely asserts a bus busy signal, but only once the slave device de-asserts the bus busy signal. It is further noted that the master device 2', in the preferred embodiment, has no use for the bus busy interrupts and must disable the hardware interrupt generated by this signal. In addition, the master device 2' must not generate a bus busy indication when it transmits to the slave devices 2 over the master transmit bus 36. The reason for this is that all devices on each of the serial buses 34, 36 of management channel 5 share the same bus busy line 68, and it is undesirable to have the master device 2' indicating that the shared slave transmit bus 34 is busy when it transmits data to the slave devices over the master transmit bus 36. Therefore, the bus busy signal is activated for the slave transmit bus 34, as viewed from the slave device's 2 perspective.

At each slave device 2 an interrupt service routine is provided for the bus busy signal for setting a flag to "true" to indicate that the slave transmit bus 34 is busy or to "false" indicating the slave transmit bus 34 is free. Thus, before a slave device 2 can transmit a bus transmit request packet to the master device 2', it checks this flag and only proceeds with the transmission if the slave transmit bus 34 is not busy.

If the slave transmit bus 34 is not busy, a slave device 2 proceeds with the bus request transmission in the following manner.

First, the bus busy hardware interrupt is disabled. This must be done in order to prevent detection and service of the bus busy interrupt that will be generated in the next step. The next step, the slave device asserts a bus busy signal to the hardware and then de-assert the bus busy signal. This is necessary to generate a hardware interrupt for the bus busy signal. Note that the hardware interrupt occurs on the transition from the bus busy asserted state to the bus busy de-asserted state, which is why the bus busy signal is pulsed, rather than keeping it in the asserted state. Then the slave device waits a predetermined time period (15 microseconds in the preferred embodiment). This is a hardware requirement to ensure that a valid low-to-high bus busy signal transition is detected and that the hardware interrupt is generated. Next, the slave device transmits a bus request packet to the master device 2'. Lastly, the bus busy hardware interrupt is enabled.

It is important to note at this point that the bus busy flag is reset "false" on a transfer to any of the following states: the Hold-Off state 66, the Silent state 64, the Allocated state 58, and the Unknown state 54. Further, the bus busy flag should not be reset on a transfer to the Available state 56 due to a potential race condition in the slave devices. For example, it is likely that on receipt of an available packet from the master device 2' that the slave devices 2 will have different processing times before the message actually causes a transfer to the Available state 56. When the bus busy flag is reset on entrance to this state, it is clear that some of the slave device flags will indicate "false," while others will still indicate "true." It the slave devices that now believe that the slave transmit bus 34 is available were to contend for the slave transmit bus 34, then those slave devices who believe that the slave transmit bus 34 is busy will ignore the bus busy interrupt and the master receive state machine 42 and the slave transmit state machine 44 will not be synchronized, causing the potential for a bus collision.

5. State Machine Operation

Figure 8:
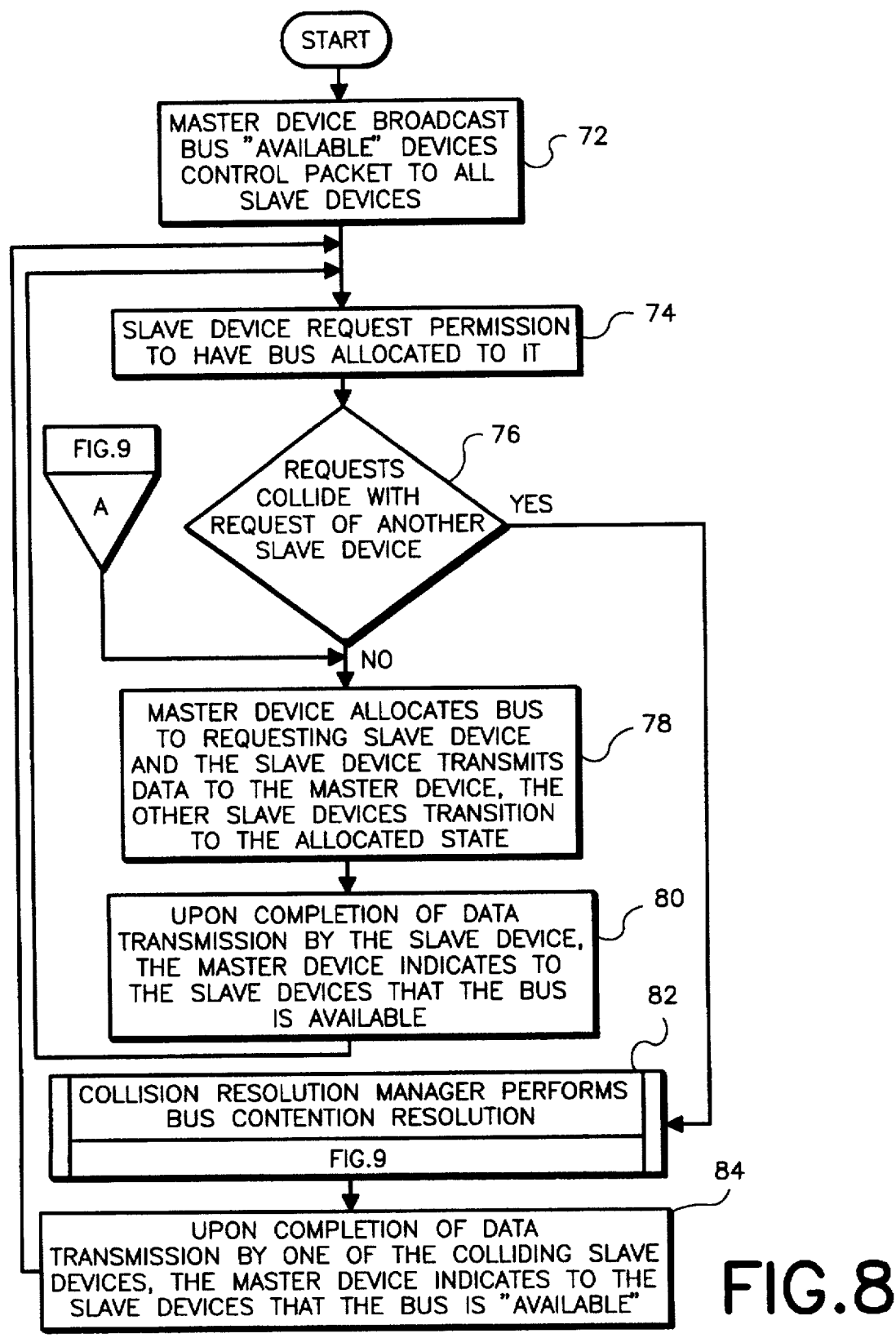
FIG. 8 is a flowchart of the operation of the datalink layer protocol of the present invention.
Figure 9:
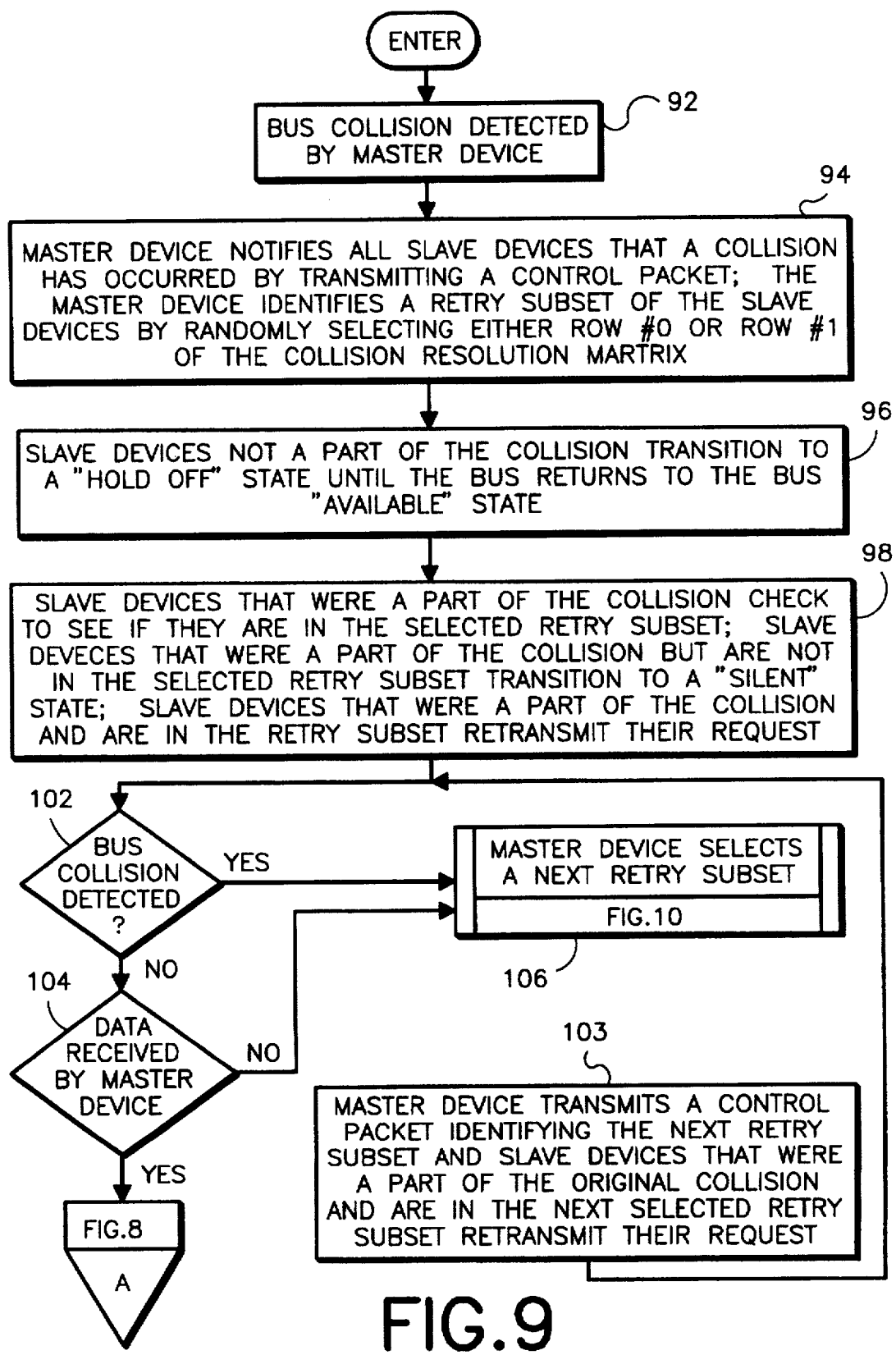
FIG. 9 is a flowchart of the operation of the collision resolution manager of FIG. 2.
Figure 10:
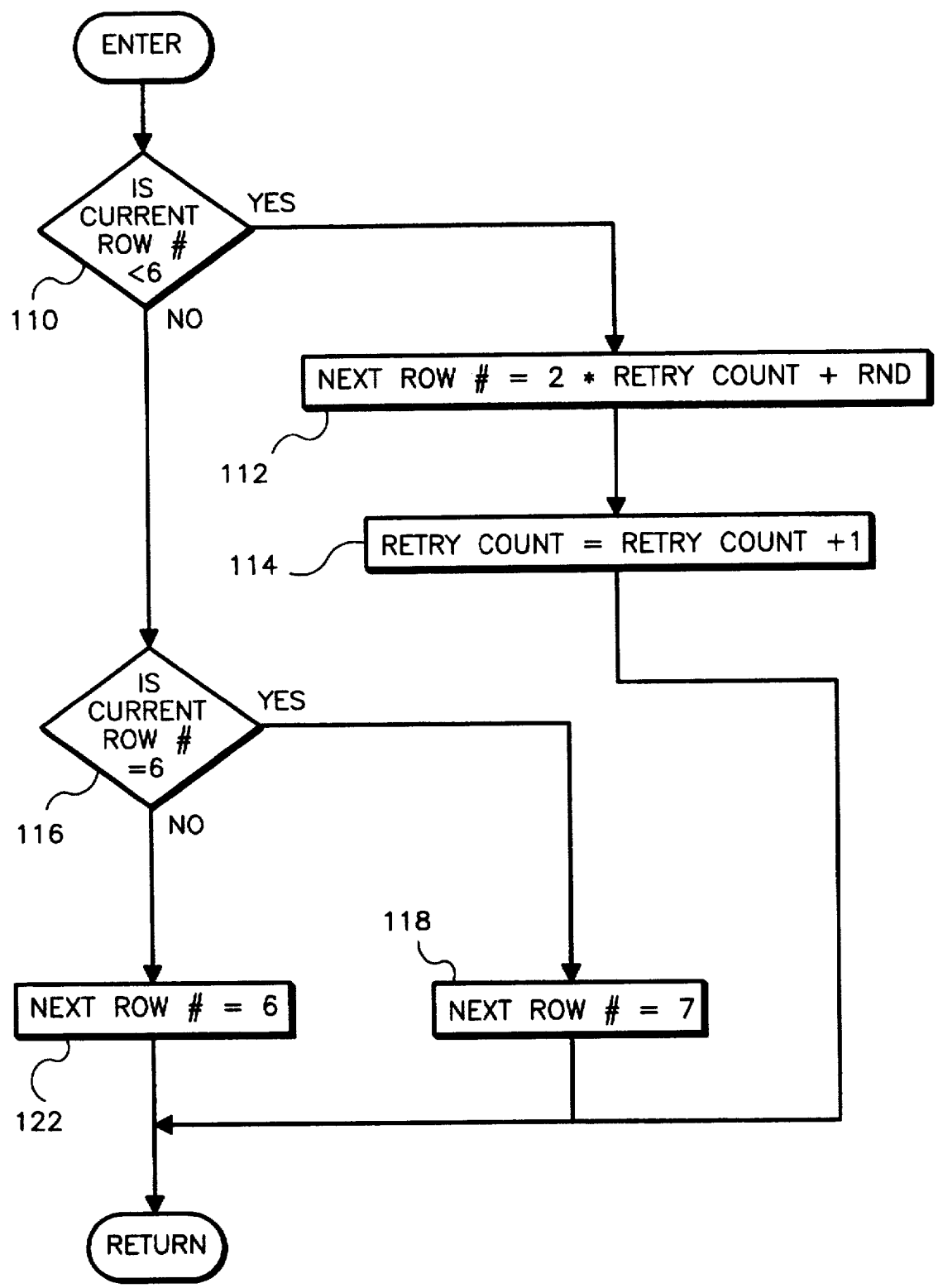
FIG. 10 is a flowchart of the operation of the row selection module of FIG. 9.

The preferred operation of sequence of events corresponding with the operation of the Master Receive State Machine 42 and the Slave Transmit State Machine 44 of the present invention and the associated methodology are described hereafter with reference to the flow-charts of FIGS. 8–10. The flowchart of an embodiment of a particular module is shown as a Figure number within the box of that module.

With reference now to FIG. 8, illustrated is the architecture and functionality for implementing a computer program comprising executable steps for causing the CSU/DSU devices to function in a particular manner as described below. During system initialization, the master device 2' and the slave devices 2 initialize to the Unknown state for a short period of time before the master device 2' eventually transitions the bus into the bus Available state and communicates this state change to all the slave devices 2 by broadcasting a control packet over master transmit bus 36, as indicated by block 72. Note that the master device 2' transmit information to the slaves devices 2 via control packets over the master transmit bus 36 which only the master device can transmit on, and therefore, will not be subject of a contention problem. Further, a control packet, for purposes of the present invention, is a small datagram that conveys information between the master and slave devices. At substantially that time, all slave devices 2 simultaneously transition to the Available state. The master device 2' and the slave devices 2 remain in the Available state until a slave device (or devices) has a datagram to transmit to the master device 2'. At this time, a slave device 2 request permission to have the bus allocate to it by sending a bus request control packet to the master device 2', as indicated by block 74. At block 76, it is determined whether the slave device's bus request collides with another slave device's request. If no collision is detected by the master device 2', then block 76 transfers to block 78 where the master device 2' allocates the bus to the requesting slave device 2 by broadcasting a control packet. At this time, all slave devices 2 other than the one given control over the slave transmit bus 34 change state to the bus Allocated state. Now the slave device 2 controlling the slave transmit bus 34 transmits its datagram to the master device 2' with no possibility of a data collision occurring. When the slave device 2 completes its data transmission, the master device 2' notifies all slave devices 2 that the bus is now available by broadcasting a control packet, as indicated by block 80. Upon receipt of this control packet, all slaves devices 2 transition to the bus Available state whereby any slave device 2 having a datagram to transmit may request permission from the master device 2' to have the bus allocated to it, as indicated in block 74.

If, however, the master device 2' detected a bus collision at block 76, block 76 transfers to module 82 where the collision resolution manager 28 performs bus contention resolution. A significant feature of the present invention is that bus collisions are only possible on the slave transmit bus between multiple slave's bus request as discussed hereinbefore. This is significant since the overall efficiency of the invention is increased as the potential for data collisions is reduced. Since there is only one state in which collisions can occur, efficiency is maintained at a high level. Upon resolving the bus collision, at module 82 whereby a colliding slave device 2 is allocated control over the slave transmit bus and allowed to complete its data transmission, module 82 transfers to block 84 where the master device 2' notifies all slaves devices 2 that the bus is now available by broadcasting a control packet. The master device 2' and the slave devices 2 again remain in the bus Available state until a slave device (or devices) have a datagram to transmit to the master, as indicated by block 74.

Once a bus collision has been detected, the collision resolution manager 28 attempts to resolve the collision as fast as possible to identify one of the colliding slave devices 2 so that its data can be transmit successfully. In general, the collision resolution manager 28 does this by taking the slaves devices 2 that are to blame for the bus collision and selectively requesting various subsets of the slave devices 2 to retry their transmissions until a subset is selected that contains only one of the slave devices 2 that was part of the original collision. This process is discussed in more detail below with reference to FIGS. 9–10.

The following description is provided to illustrate the utility and functionality of the collision resolution manager 28 as implemented at module 82 in the preferred embodiment via the flowcharts illustrated in FIGS. 9 and 10. With particular reference to FIG. 9, after entry, block 92 indicates that the master device 2' has detected a bus collision on serial bus 34 as determined by block 76 in FIG. 8. Worth discussing at this point is the method by which the collision detection mechanism 26 (Pig. 2) of the master device detects a bus collision. As previously discussed, by the design of the inter-connectivity between the master device 2' and the slave devices 2, the only time a bus collision can occur in a steady-state nest carrier is when two or more slave devices 2 send a bus request to the master device 2' over serial bus 34, and those requests overlap in time. When this occurs, the bus collision detection mechanism 26 utilizes the serial communication channel (SCC) hardware associated with the processor 12 to indicate that bad communication signals have been received on the serial bus 34 as caused by timing differences in the control pulses on the serial bus 34. This is commonly referred to as SCC framing error indication. It is important to note that this is but one technique of collision detection that could be implemented as the part of the collision detection mechanism 26, and numerous other suitable techniques known to one skilled in the art could alternatively be implemented to perform the same functionality as described above. Further, as will be explained below, the collision detection mechanism 26 also looks for software validation by the protocol manager 10 which sends a control packet from the master device to the slave devices signaling that the last transmission was successful. Accordingly, only the master device 2' which receives the bus request from the slave devices requires implementation of the collision detection mechanism 26 for the detection of data collisions on slave transmit bus 34.

Referring back to FIG. 9, upon detection of the bus collision, block 92 transfers to block 94 where the master device 2' notifies all slave devices 2 that a collision has occurred by transmitting a control packet over serial bus 36. In addition, at block 94, the master device 2' randomly identifies a re-try subset of slave devices 2 defined by either row 0 or row 1 of a Collision Resolution Matrix as provided below and denoted as Table III.

bus Available state. Those slave devices that were part of the original collision and are in the retry subset immediately retransmit their bus request over slave transmit bus 34. Next, block 98 transfers to block 102 where the master device 2' checks to see if there is another collision on slave transmit bus 34 which indicates that more than one of the slave devices in the original collision are in the selected retry subset. If a collision is detected by block 102, block 102 transfers to module 106. If no collision is detected, then block 102 transfers to block 104 which determines if the master device 2' received any data over slave transmit bus 34 following the request for retransmission. If no data was received within a predetermined period of time, this indicates that none of the colliding slave devices 2 were in the selected subset, and therefore, block 104 also transfers to block 106. In the preferred embodiment, where the slave transmit bus 34 is a 38.4 Kbps serial bus, it has been determined that a period of 30 milliseconds is suitable. If data was received by the master device 2', indicating only one of the colliding slave devices was in the selected retry subset, block 104 transfers to block 78 of FIG. 8 where the steps of block 78 through 84 are executed in the same manner as described hereinbefore so as to allow that slave device 2 to transmit its datagrams over slave transmit bus 34.

If a collision is detected at block 102, or if no data is detected at block 104, then module 106 selects a new retry subset of the Collision Resolution Matrix. The preferred steps of module 106 will be discussed below with reference to FIG. 10. Once module 106 has selected a next retry subset, block 106 transfers to block 108 where the master

TABLE III

Collision Resolution Matrix

| Device # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Row 0 | T | F | T | F | T | F | T | F | T | F | T | F | T | F | T | F |
| Row 1 | F | T | F | T | F | T | F | T | F | T | F | T | F | T | F | T |
| Row 2 | T | T | F | F | T | T | F | F | T | T | F | F | T | T | F | F |
| Row 3 | F | F | T | T | F | F | T | T | F | F | T | T | F | F | T | T |
| Row 4 | T | T | T | T | F | F | F | F | T | T | T | T | F | F | F | F |
| Row 5 | F | F | F | F | T | T | T | T | F | F | F | F | T | T | T | T |
| Row 6 | T | T | T | T | T | T | T | T | F | F | F | F | F | F | F | F |
| Row 7 | F | F | F | F | F | F | F | F | T | T | T | T | T | T | T | T |

When the slave devices 2 receive the collision notification from the master device 2', the slave devices that are not a part of the original bus collision transition to the Hold/Off state and will not attempt to transmit until the bus returns to the bus Available state as indicated by block 96. In essence, these slave devices 2 are temporarily locked-out from transmitting over slave transmit bus 34 until the original bus collision has been resolved. Block 96 then transfers to block 98 where the slave devices 2 that were a part of the collision check to see they are in the selected retry subset that can retransmit their bus requests. This is done by the collision resolution manager 28 of each slave device 2. If the slave devices 2 that were a part of the original collision are not in the selected retry subset, then they transition to a Silent state and will not attempt to transmit until the bus returns to the device 2' transmits a control packet over master transmit bus 36 identifying the next retry subset. The slave devices 2 that were a part of the original collision and that are in the next subset re-transmit their request to the master device 2' over slave transmit bus 34. Block 108 then transfers to block 102 where the steps of block 102, 104, 108 and module 106 are repeated until a single slave device 2 completes a successful transmission of its request over the slave transmit bus 34. Note, by the engineering of the Collision Resolution Matrix, the number of times this subset reduction scheme described hereinbefore must be performed before a single slave device 2 successfully transmits is limited to a definite number that is dependent upon the number of slave devices 2 sharing the communication channel. This ability to provide deterministic resolution of a bus collision is especially desirable with low-bandwidth serial buses.

Thus, a significant feature of the present invention is the Collision Resolution Matrix. The Collision Resolution Matrix provides the resolution logic to the collision resolution manager 10 of the master and slave devices for identifying retry subsets so that the master device 2' and the slave devices 2 are in agreement as to what slave devices 2 will retransmit their requests following a collision. The Collision Resolution Matrix is known by the master device 2' and the slave devices 2 and essentially groups the slave devices 2 into retry subsets identified by respective row numbers, each subset including approximately one-half of the slave devices 2. Thus, in the preferred embodiment, the number of columns equals the number of devices 2 and the number of rows is approximately equal to one-half of the number of devices. Note, for simplicity, the Collision Resolution Matrix contains an even number of devices and includes the master device even though the master device does not need to be in the matrix. However, the master device is included because the master device can change to a slave device and vice-versa by user intervention, and this solution does not require a change to the Collision Resolution Matrix in this event. Accordingly, in a worse-case scenario with the preferred embodiment, there will be at most four retries (assuming 16 devices) before a retry subset is selected that only contains one slave device that was a part of the original collision. In the Collision Resolution Matrix, the "T" means the slave is in the retry subset, and a "F" means that the slave device is not in the retry subset and will not attempt to transmit again until the bus is returned to the available state by the bus master.

In order to support the operation of module 106 as described below, the state information associated with the variables in the operation of the collision resolution manager 28 is maintained by the master device 2'. The state information for each variable is re-initialized each time the bus transitions to the Available state. This is the state that the bus always returns to once another slave device 2 can attempt to transmit. When the bus is in any other state, all slave devices are prohibited from transmitting unless they are specifically requested to do so by the master device as described hereinbefore. The variables of the preferred embodiment includes Row and Retry Count. When re-initialized upon the bus transitioning to the Available state, the state of Row and Retry Count are set to zero.

With reference to FIG. 10, upon entry, block 110 determines if the current Row number is less than six (6). If it is, then block 110 transfers to block 112 where the next Row number is determined by multiplying the current Retry Count by the number two and adding the random variable RND. The random variable RND essentially generates in a random manner either a zero (0) or a one (1) when called. Thus, based upon the action of block 112, the first Row number will be either 1 or 2 because the Retry Count will be zero (0) upon initialization. Block 112 then transfers to block 114 where the Retry Count is incremented by one (1). Therefore, each subsequent Row number will be one (1) to three (3) greater than the previous Row number. For example, the Row number of the second retry subset will be either two (2) or three (3), the third time the Row number will be either four (4) or five (5), etc. However, if block 110 determines that the current Row number is not less than six (6), block 110 then transfers to block 116 where it is determined if the current Row number is equal to six (6). If it is, then block 116 transfers to block 118 which sets the next Row number to seven (7). If block 116 determines that the current Row number is not equal to six (6), then block 116 transfers to block 122 which sets the next Row number to six (6). Once the next Row number has been determined by one of blocks 112, 118, or 122, then module 106 transfers to block 108 of FIG. 8 where the aforementioned process repeated with the next Row number.

In order to more fully explain the present invention, FIG. 11A–11D are provided to illustrate several exemplary cases of bus collision resolution by the collision resolution manager 28. FIGS. 11A–11D provide graphical illustrations of the communications between a particular slave device N and the master device during the occurrence of a bus collision where the slave device N is one of the colliding devices.

Figure 11A:
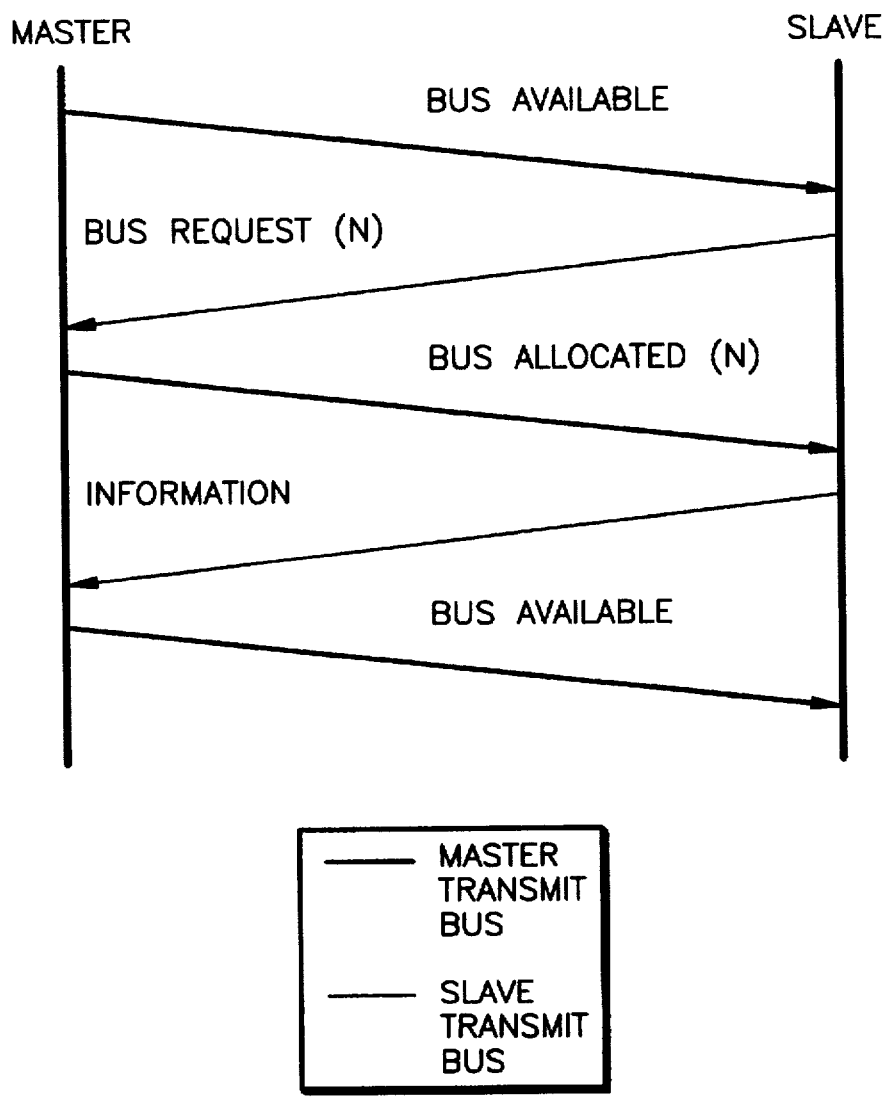

FIG. 11A is an illustration of a slave device requesting the slave transmit bus with no collision occurring. Initially, the master device transmits a bus available control packet over master transmit bus 36. In response, slave device N sends a bus request to the master device requesting to transfer over serial bus 34. In the case illustrated in FIG. 11A, slave device N is the only slave device responding with a bus request. Consequently, the master device transmits another control packet indicating that the bus is allocated to slave device N. The slave device N subsequently transmits its information (datagrams) over slave transmit bus 34. Upon the completion of slave device N's transmission, the master device issues a bus available control packet verifying that the transmission was successful.

FIG. 11B illustrates a best-case scenario for bus collision resolution. Initially, the master device issues a bus available control packet over master transmit bus 36. In response, multiple slave devices attempt to request the bus at the same time and their requests collide. Upon detecting the collision, the master device issues a bus collision control packet identifying a retry subset value of zero (0) which specifies that the slave devices should access row zero (0) of the Collision Resolution Matrix to determine whether or not they are allowed to retry their bus request. In this case, the contention was resolved after one attempt because slave device N was the only slave device retrying its request. Consequently, the master device issues a bus allocated control packet granting control of the serial bus 34 to slave device N which subsequently transmits its information (datagram) over slave transmit bus 34. Again, upon slave device N completing its transmission, the master device issues a bus available control packet indicating the transmission was successful.

Figure 11C:
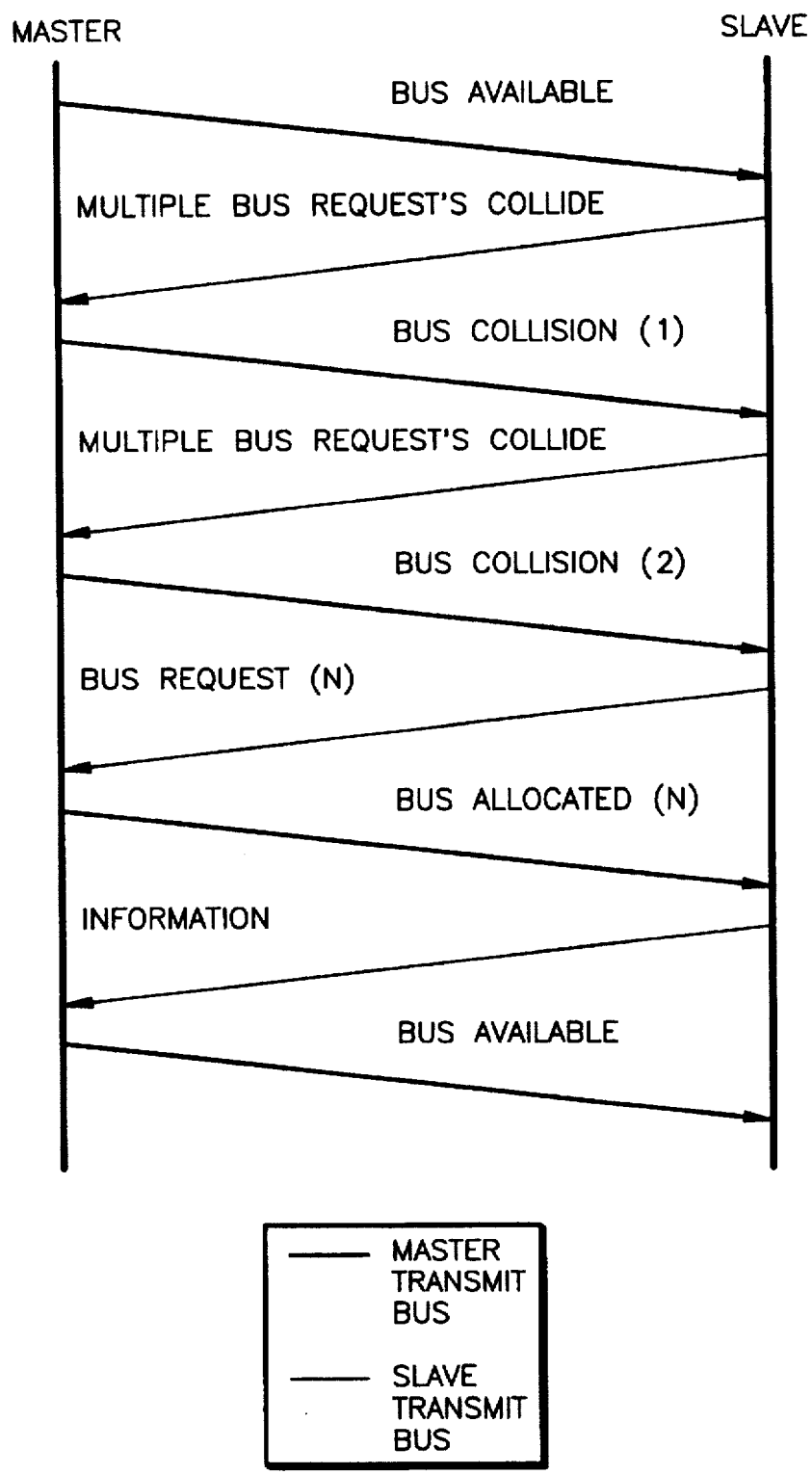

FIG. 11C illustrates a case requiring multiple retries before the bus collision is resolved. As with the previous examples, the master device begins by transmitting a bus available control packet which results in multiple slave devices attempting to request the bus at the same time, thereby resulting in a collision. Upon the detecting the collision, the master device issues a bus collision control packet identifying a subset value of one (1) which specifies that the slave devices that were a part of the collision should access row one (1) of the Collision Resolution Matrix to determine whether or not they are allowed to retry their bus request. As previously discussed, this initial row number will always be zero (0) or one (1). In this example, on the second attempt by the slave devices in the retry subset, some of the slave devices are still colliding. Therefore, the master device issued another bus collision packet specifying row two (2) of the Collision Resolution Matrix. In response, only one slave device, slave device N, responded with a bus request, thereby resolving the contention. The master device then grants control of slave transmit bus 34 to slave device N so that slave device N can transmit its information (datagrams) and, if the transmission was successful, the master device issued a bus available control packet, as described above.

Figure 11D:
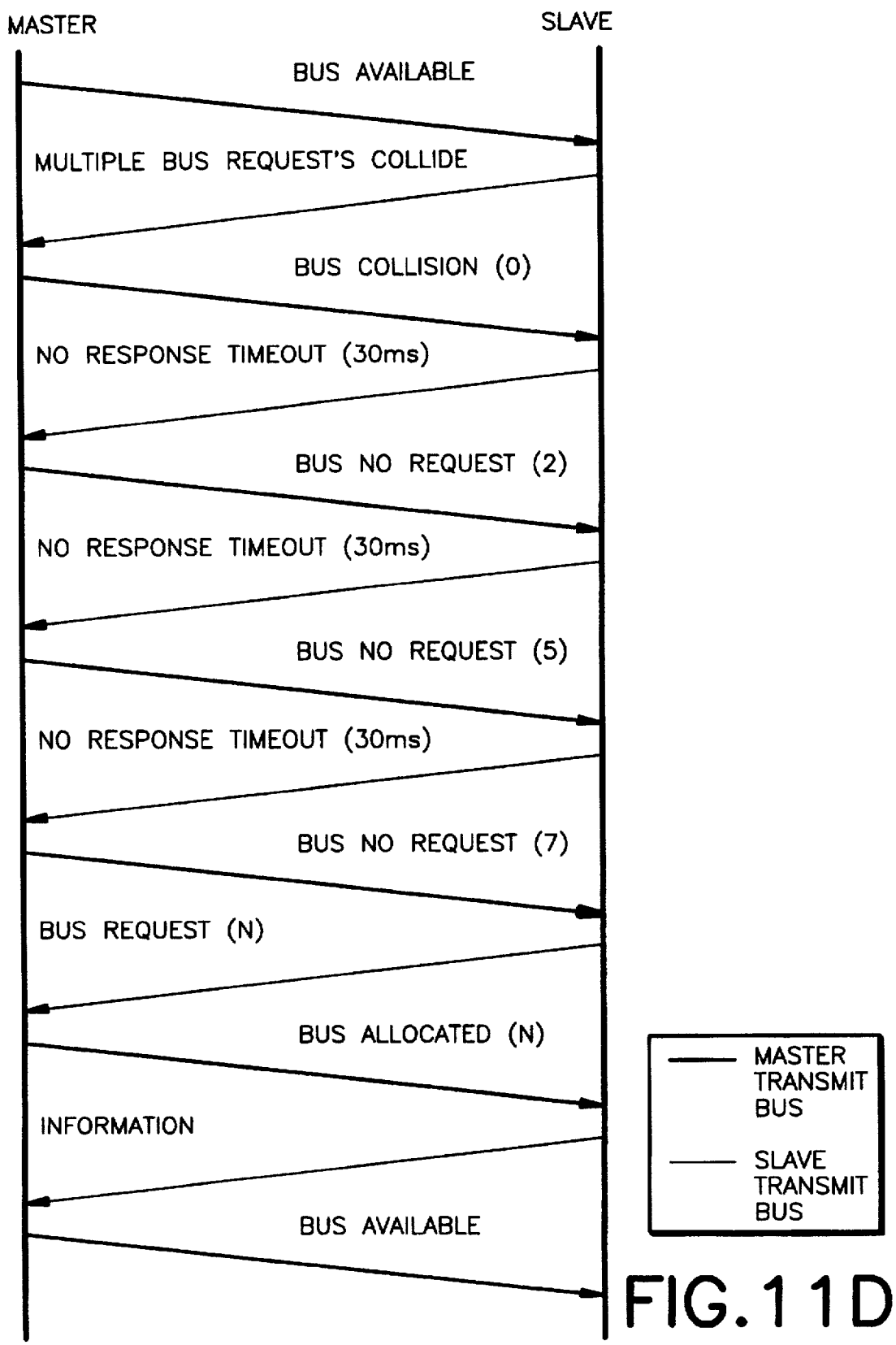

FIG. 11D provides a worst-case bus collision resolution. In the manner previously discussed, the master device initially issues a bus available control packet which is responded to by multiple slave devices requesting the bus at the same time causing a bus collision. The master device then issues a bus collision control packet with a retry subset value of zero (0) which specifies that the slave devices that were a part of the collision should access rows zero (0) of the Collision Resolution Matrix to determine whether or not they are allowed to retry their bus transmissions. In this case, none of the buses in the original collision were in the subset designated by row zero (0) of the Collision Resolution Matrix. Accordingly, even though there was not a collision detected, no data was received over slave transmit bus 34 within the predetermined time-out period causing the master device to select a next retry subset and issues a no request control packet identifying a subset value of two (2) which specifies that the slaves should access row two (2) in order to determine whether or not they are allowed to retry their bus request. Note that the master device only sends a bus collision control packet when it actually detects a collision and a bus no request control packet in all other circumstances. Again, no data is received by the master bus within the predetermined time-out period indicating that none of the slave devices that were a part of the original collision are within the subset defined by row two (2) of the Collision Resolution Matrix. The master device issues two more no requests control packets before a single slave device responds. Specifically, as shown in FIG. 11D, in response to no request control packet designating the subset value of seven (7), slave device N is the only slave device to retry its bus request. Consequently, the master device issues a bus allocated control packet granting control of slave transmit bus 34 to slave device N in response to which slave device N transmits its information (datagrams) over serial bus 34. The master device subsequently issues a bus available control packet upon successful completion of slave device N's transmission.

In concluding the detailed description, it should be noted that it will be obvious to those skilled in the art that many variations and modifications can made to the preferred embodiment without substantially departing from the principles of the present invention. Also such variations and modifications are intended to be included herein within the scope of the present invention as set forth in the appended claims. Further, in the claims hereafter, the structures, materials, acts, and equivalents of all means or step-plus function elements are intended to include any structure, materials or acts for performing their cited functions.

Wherefore, the following is claimed:

1. A computer-based method for coordinating data transmissions over a serial bus shared by a master device and a plurality of slave devices, said master device being responsible for controlling data transmission activity over said serial bus so that only one said slave device controls said serial bus at a time, comprising the steps of:

generating a bus busy signal that is received by other said slave devices indicating said first slave device's intent to request said serial bus in order to reduce the likelihood of a bus collision;

transmitting a bus request from said first slave device to said master device to request control of said serial bus for transmitting data over said serial bus;

resolving bus collisions on said serial bus with said master device if multiple said bus requests collide on said serial bus;

after resolving any bus collisions, allocating said serial bus with said master to said first slave device so as to prevent other said slave devices from transmitting data over said serial bus while said first slave device is allocated to said serial bus; and making said serial bus available once said first slave device has completed transmission of said data over said serial bus so that one of said slave devices with data to transmit over said serial bus can transmit another bus request to said master device.

2. The method of claim 1, further comprising the steps of defining states for said master device with respect to said transmission activity on said serial bus, and defining corresponding states for said slave devices with respect to said transmission activity on said serial bus so that said master device and said slave devices are synchronized in operation with respect to said serial bus.

3. The method of claim 2, wherein the step of defining states for said master device includes defining an unknown state, an available state, an allocated state, and a collision state.

4. The method of claim 3, wherein the step of defining states for said slave devices includes defining an unknown state, an available state, an allocated state, a bus request state, a silent state, and a hold-off state.

5. The method of claim 1, wherein said bus request comprises a control frame including a control identifier and an address.

6. The method of claim 1, wherein said data comprises a data frame including a control identifier, an address, and data.

7. The method of claim 4, further defining said allocated state as meaning said master device has allocated control of said serial bus to one of said slave devices and remaining said slave devices are refrained from using said serial bus until an event causes said remaining slave devices to transition into said Available state.

8. The method of claim 4, further defining said available state as meaning that no said slave device controls said serial bus and any said slave device may request control of said serial bus from said master device.

9. The method of claim 4, further defining said collision state as meaning that bus requests from multiple said slave devices collided on said serial bus and said master device is resolving said collision.

10. A computer-based system for coordinating data transmissions over a serial bus shared by a single master device and a plurality of slave devices, said master device being responsible for controlling data transmission activity over said serial bus so that only one said slave device controls said serial bus at a time, comprising:

a bus busy line for enabling said slave devices intending to contend for said serial bus to transmit thereover a bus busy signal to other said slave devices in order to reduce the likelihood of a bus collision;

a collision detection mechanism for detecting a collision of bus requests on said serial bus caused by multiple bus requests submitted by respective said slave devices colliding on said serial bus;

a collision resolution manager for resolving said bus collisions on said serial bus; and a protocol manager for allocating said serial bus to a single said slave device at a time in response to said bus requests submitted by respective said slave devices after any said bus collisions have been resolved.

11. The system of claim 10, wherein said protocol manager defines operational states of said master device with respect to said transmission activity on said serial bus, and for defining corresponding operational states for said slave devices with respect to said transmission activity on said serial bus so that said master device and said slave devices are synchronized in operation with respect to said serial bus.

12. The system of claim 10, wherein said bus request comprises a control frame including a control identifier and an address.

13. The system of claim 10, wherein said data comprise data frames including a control identifier, an address, and data.

14. The system of claim 10, wherein said master device communicates to said slave devices over a data-link between said master device and said slave devices.

15. The system of claim 11, wherein said states of said master device include unknown, available, allocated, and collision and wherein said states of said slave devices include unknown, available, allocated, bus request, silent and hold/off.

16. The system of claim 15, wherein said allocated state means said master device has allocated control of said serial bus to one of said slave devices and remaining said slave devices are refrained from using said serial bus until an event causes said remaining slave devices to transition into said available state.

17. The system of claim 15, wherein said available state means that no said slave device controls said serial bus and any said slave device may request control of said serial bus from said master device.

18. The system of claim 15, wherein said collision state means that bus requests from multiple said slave devices collided on said serial bus and said master device is resolving said collision.

* * * * *